US012669636B2

(12) United States Patent
Jung et al.

(10) Patent No.: US 12,669,636 B2
(45) Date of Patent: Jun. 30, 2026

(54) BASIC LAYER FOR AN OPTICAL FILTER

(71) Applicant: LMS CO., LTD., Pyeongtaek-si (KR)

(72) Inventors: Joon Ho Jung, Pyeongtaek-si (KR); Hee Kyeong Kim, Pyeongtaek-si (KR); Nam Woo Kang, Pyeongtaek-si (KR)

(73) Assignee: LMS CO., LTD., Pyeongtaek-si (KR)

(*) Notice: Subject to any disclaimer, the term of this patent is extended or adjusted under 35 U.S.C. 154(b) by 375 days.

(21) Appl. No.: 18/352,290

(22) Filed: Jul. 14, 2023

(65) Prior Publication Data

US 2024/0027665 A1 Jan. 25, 2024

(30) Foreign Application Priority Data

Jul. 19, 2022 (KR) .......................... 1020220089109
Jun. 30, 2023 (KR) .......................... 1020230085127

(51) Int. Cl.
*G02B 5/20* (2006.01)

(52) U.S. Cl.
CPC .................................... *G02B 5/208* (2013.01)

(58) Field of Classification Search
CPC . G02B 5/208; G02B 5/20; G02B 5/22; G02B 5/226; G02B 5/28; G02B 5/281; G02B 5/282; G02B 5/285; G02B 5/26
See application file for complete search history.

(56) References Cited

U.S. PATENT DOCUMENTS

2001/0005278 A1* 6/2001 Onomichi .............. G02B 5/208 359/885
2007/0231495 A1* 10/2007 Ciliske ..................... B05D 7/04 427/407.1
2018/0031745 A1 2/2018 Kim et al.
2020/0040161 A1 2/2020 Kubo et al.
2023/0204835 A1* 6/2023 Heo ....................... G03B 17/12 359/359

FOREIGN PATENT DOCUMENTS

| | | | |
|---|---|---|---|
| CN | 110462461 | A | 11/2019 |
| CN | 113677687 | A | 11/2021 |
| JP | 2014048402 | A | 3/2014 |
| JP | 2016018092 | A | 2/2016 |
| JP | 2016018156 | A | 2/2016 |
| JP | 2018020540 | A | 2/2018 |
| JP | 2020504772 | A | 2/2020 |
| JP | 2020109496 | A | 7/2020 |

(Continued)

OTHER PUBLICATIONS

Okura Takahiro, JP2014048402A, published Mar. 17, 2014, English language machine translation generated Sep. 18, 2025 (Year: 2014).*

(Continued)

*Primary Examiner* — Stephone B Allen
*Assistant Examiner* — Adam B Allen
(74) *Attorney, Agent, or Firm* — NKL LAW; Jae Youn Kim

(57) ABSTRACT

The present invention provides a basic layer for an optical filter, an optical filter, and their application for an image capture device. The present invention provides a basic layer for an optical filter and an optical filter having excellent optical properties while exhibiting excellent durability including a moisture-resistant layer.

19 Claims, 16 Drawing Sheets

(56) References Cited

FOREIGN PATENT DOCUMENTS

| | | | | | |
|---|---|---|---|---|---|
| KR | 20190124796 | A | | 11/2019 | |
| KR | 20220039397 | A | | 3/2022 | |
| TW | 201814334 | A | | 4/2018 | |
| TW | 202212867 | A | | 4/2022 | |
| WO | 2018174116 | A1 | | 9/2018 | |
| WO | WO-2022065678 | A1 | * | 3/2022 | ............. G02B 5/281 |

OTHER PUBLICATIONS

Office Action dated Jun. 4, 2024 for the corresponding Patent Application No. JP 2023-117103.

* cited by examiner

| 200 |
|---|
| 100 |

| 201 |
|---|
| 100 |
| 202 |

| 300 |
|---|
| 201 |
| 100 |
| 202 |

BASIC LAYER FOR AN OPTICAL FILTER

FIELD

This application relates to a basic layer for an optical filter and an optical filter using the basic layer for an optical filter for an image capturing device.

BACKGROUND

An imaging capturing device using a charge-coupled device (CCD) or a complementary metal-oxide-semiconductor (CMOS) image sensor requires having an optical filter. The optical filter is used to obtain good color reproducibility and a clear image, and it should have a characteristic of transmitting visible light and shielding infrared such as near-infrared light. Such an optical filter is also called a near-infrared cut-off filter.

Such an optical filter is required to transmit only light in visible light region as much as possible. Therefore, the optical filter is required to show a transmittance curve that transmits visible light as high as possible and blocks ultraviolet light and infrared light. However, it is not easy to obtain a high transmittance curve for the transmittance of visible light while accurately blocking ultraviolet light near the short wavelength region of visible light and infrared light in the long wavelength region of visible light.

A publicly known optical filter comprises an absorption layer containing an absorbent; a dielectric film containing a reflective layer. If the dielectric film is utilized, it is possible to block light in the ultraviolet and/or infrared region. However, the dielectric film has a characteristic that the transmittance curve shifts according to an incident angle. Accordingly, in the conventional optical filter, an absorption layer containing a near-infrared absorption dye having a small incident angle dependence of transmittance is utilized to compensate for the disadvantages of the dielectric film.

A substrate, so-called an infrared absorption glass (also called as a blue glass) having near-infrared absorption properties is used for an optical filter and the substrate that becomes the optical filter itself is also known. An infrared absorption glass is a glass filter where CuO or the like is added to the glass to selectively absorb light in the near infrared wavelength region.

However, although the conventional infrared absorbing glass exhibits the above absorption characteristics, the absorption ability for long-wavelength infrared rays is ineffective, so that a dielectric film or the like must still be utilized.

In recent years, an infrared absorption glass which exhibits excellent absorption characteristics with respect to infrared light of the long wavelength by adjusting compositions of the infrared light is known. When such a glass is applied, it is advantageous to form an optical filter where a shift with respect to an incident angle is suppressed by not forming or forming a small dielectric film.

However, although such a glass shows excellent absorption characteristics even for long-wavelength infrared light, there is a problem where moisture resistance and heat resistance are inferior.

FIG. 5 shows the transmittance spectrum of the glass as described above. Such a glass exhibits an appropriate absorption ability for long-wavelength infrared light as indicated by the dotted line in FIG. 5, but its properties are rapidly lost after being maintained in the humidity/heat-resistant condition (solid line indicated in FIG. 5).

In an optical filter, a phenomenon, a so-called ripple phenomenon, needs to be suppressed. The ripple phenomenon is a phenomenon where a periodic change in transmittance occurs in the visible light transmission region of an optical filter, and specifically, a phenomenon where the actual transmittance in a predetermined region increases and decreases compared to an average transmittance of the corresponding region is periodically observed.

An imaging capturing device senses visible light transmitted through an optical filter by a sensor for each RGB (Red, Green, Blue). The sensitivity of each sensor of RGB is adjusted in consideration of the average transmittance for each wavelength. When a ripple phenomenon occurs, fluctuations occur even in the light recognized by the sensor thereby reducing color reproducibility.

The ripple phenomenon may generate a region (so-called a bunk region) where the transmittance of the visible light region is momentarily dropped. Consequently, the bunk region can cause a ghost phenomenon and the ghost phenomenon also deteriorates color reproducibility.

Therefore, it is required to provide a basic layer for an optical filter and an optical filter having excellent optical properties while exhibiting excellent durability including a moisture-resistant layer. It is possible to provide the basic layer for an optical filter and the optical filter by having excellent blocking properties for wavelength bands requiring blocking such as ultraviolet and infrared light, by having excellent transmittance of visible light, and by preventing a ripple phenomenon in the visible region. The basic layer for an optical filter and the optical filter can also secure the above properties even when an infrared absorption glass, particularly a glass known to have poor moisture resistance and heat resistance is utilized as an infrared absorption substrate for the basic layer for an optical filter and the optical filter.

SUMMARY

An object of the present application is to provide a basic layer for an optical filter and an optical filter.

Another object of the present application is to provide a basic layer for an optical filter, which comprises a moisture-resistant layer and therefore exhibits excellent durability and also has excellent optical properties, and an optical filter comprising the same.

Another object of the present application is to provide a basic layer for an optical filter, which has excellent blocking properties with respect to wavelength bands required to be blocked such as ultraviolet and infrared light, has excellent transmittance with respect to visible light, and preventing a ripple phenomenon in the visible region, and an optical filter comprising the same.

Another object of the present application is to provide a basic layer for an optical filter, which has the above described properties even when an infrared absorption substrate such as an infrared absorption glass, which is known to have poor moisture resistance and heat resistance, is utilized as a substrate and an optical filter comprising the same.

According to an embodiment of the invention, there is provided that a basic layer for an optical filter comprising an infrared absorption substrate; and a moisture-resistant layer formed on one or both surfaces of the infrared absorption substrate where a ripple value in a wavelength range of 450 nm to 560 nm is 7% or less, and an absolute value of $\Delta T_V$ according to Equation 1 is 30% or less below:

$$\Delta T_V = 100 \times (T_{V\cdot f} - T_{V\cdot i})/T_{V\cdot i}. \quad \text{[Equation 1]}$$

In Equation 1, $T_{V,f}$ is an average transmittance in a wavelength range of 425 nm to 560 nm of the optical filter after maintaining the optical filter at a temperature of about 85° C. and a relative humidity of 85% for 120 hours, and $T_{V,i}$ is an average transmittance in the wavelength range of 425 nm to 560 nm of the optical filter before maintaining the optical filter at the temperature and the humidity.

In an embodiment, an average transmittance in a wavelength range of 800 nm to 1000 nm is 6% or less for the basic layer for an optical filter in the present invention.

In an embodiment, a T50% cut-off wavelength has a transmission band in a range of 590 nm to 660 nm for the basic layer for an optical filter in the present invention.

In an embodiment, an average transmittance in the wavelength range of 425 nm to 560 nm of the transmission band is 75% or more for the basic layer for an optical filter in the present invention.

In an embodiment, the moisture-resistant layer is in contact with the infrared absorption substrate, and the adhesion strength of the moisture-resistant layer according to ASTM D3359 standard is 3B or more for the basic layer for an optical filter in the present invention.

In an embodiment, the infrared absorption substrate is CuO containing fluorophosphate glass substrate or CuO containing phosphate glass substrate for the basic layer for an optical filter in the present invention.

In an embodiment, the moisture-resistant layer includes at least one selected from a group consisted of polysilazane, silane compound, polysilsesquioxane, polysiloxane, polysilane, polycarbosilane, silicone resin, silica, fluoro resin, epoxy resin, urethane resin, and polycarbonate for the basic layer for an optical filter in the present invention.

In an embodiment, the moisture-resistant layer has thickness in the range of 0.01 m to m for the basic layer for an optical filter in the present invention.

In an embodiment, a light absorption layer is formed on one or both surfaces of the infrared absorption substrate for the basic layer for an optical filter in the present invention.

According to another embodiment of the invention, there is provided that an optical filter comprising any one of the basic layer for an optical filters in the embodiment above and a dielectric film is further formed on one or both surfaces of the infrared absorption substrate of the basic layer for an optical filter.

In another embodiment, the dielectric film includes first and second sub-layers having different refractive indices and alternately stacked for the optical filter in the present invention.

In another embodiment, the first and second sub-layers are formed to satisfy the V value of 17 or less by Equation 2:

$$V = K \times \{[(n_1/n_2)^{2p} \times (n_1^2/n_s) - 1]/[(n_1/n_2)^{2p} \times (n_1^2/n_s) + 1]\}^2. \quad \text{[Equation 2]}$$

In Equation 2, $n_1$ is a refractive index of the first sub-layer, $n_2$ is a refractive index of the second sub-layer, $n_s$ is a refractive index of a transparent substrate, K is a total number of the first sub-layer and the second sub-layer in the dielectric film, and p is a number satisfying K=(2p+1) for the optical filter in the present invention.

In another embodiment, the ratio ($n_1/n_2$) of the refractive index ($n_1$) of the first sub-layer and the refractive index ($n_2$) of the second sub-layer is in the range of 1.4 to 2.0 for the optical filter in the present invention.

In another embodiment, the refractive index $n_1$ of the first sub-layer is in the range of 1.8 to 3.5 for the optical filter in the present invention.

In another embodiment, the ratio ($n_1/n_s$) of the refractive index ($n_1$) of the first sub-layer to the refractive index ($n_s$) of the transparent substrate is in the range of 1.4 to 2.0 for the optical filter in the present invention.

In another embodiment, K in Equation 2 is 15 or less for the optical filter in the present invention.

In another embodiment, the thickness of the first and second sub-layers is in the range of 5 nm to 200 nm, respectively, and the average value of the thickness of the first sub-layers and the thickness of the second sub-layers included in the dielectric film is in the range of 5 nm to 70 nm for the optical filter in the present invention.

In another embodiment, the dielectric film has a thickness in a range of 100 nm to 500 nm for the optical filter in the present invention.

In another embodiment, the dielectric films are formed on both surfaces of the infrared absorbing substrate for the optical filter in the present invention.

According to another embodiment of the invention, there is provided that an imaging capturing device comprising the optical filter in another embodiment above.

DETAILED DESCRIPTION

Figure 1:
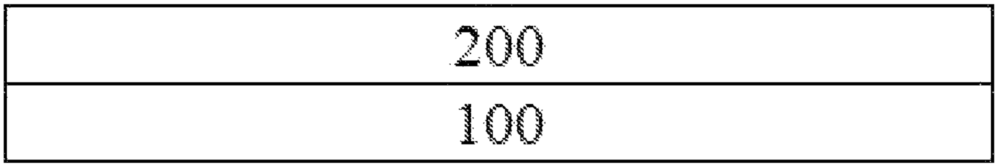
FIGS. 1 and 2 are drawings showing an exemplary stacked structure of a basic layer for an optical filter, respectively.

Various embodiments and terms used in the specification are not intended to limit the technical features described in the specification to specific embodiments, but it should be understood to include various modifications, equivalents, or substitutions of the embodiments. In connection with the description of the drawings, similar reference numerals may be used for similar or related components. The singular form of the noun corresponding to the item may include one or more of the elements unless the relevant context clearly dictates otherwise.

Embodiments will be described with reference to the associating drawings. In describing the present embodiment, the same names and the same reference numerals are used for the same components, and an additional description thereof will be omitted. In addition, in describing the embodiment of the present invention, the same names and reference numerals are used for components having the same functions, and it is substantially not completely the same as in the prior art.

According to various embodiments, terms such as "comprise" or "have" are intended to designate the presence of a feature, number, step, operation, component, part, or combination described in the specification. It should be understood, however, that the above does not preclude the possibility of addition or existence of one or more of other features, or numbers, steps, operations, components, parts, or combinations.

For those physical properties mentioned in the present invention where the result of measuring temperature and/or pressure may affect, it is measured at room temperature and/or atmosphere pressure unless otherwise specified. The term "room temperature" used in the present invention refers to a natural temperature that is not heated or not reduced, for example, it means any temperature within the range of 10° C. to 30° C., a temperature of about 23° C. or about 25° C. In addition, in the present specification, the unit of temperature is Celsius (° C.) unless otherwise specified.

In the present invention, the term "atmospheric pressure" is a natural pressure that is not pressurized or depressurized. It usually means about 1 atmosphere of atmospheric pressure having the value of about 740 mmHg to 780 mmHg. In the case of a physical property in which the measured humidity affects the result in the present invention, the physical property is a physical property measured at natural humidity that is not specifically controlled at the room temperature and/or atmosphere pressure.

In the case where an optical characteristic (e.g., refractive index) referred to in the present invention is a characteristic that varies depending on the wavelength, the optical characteristic is a result obtained for light having a wavelength of 520 nm unless otherwise specified.

In the present invention, the term "transmittance" means an actual transmittance (measured transmittance) checked at a specific wavelength unless otherwise specified.

In the present invention, the term "average transmittance" is a result of obtaining an arithmetic average of the measured transmittances after measuring transmittance of each wavelength while increasing the wavelength by 1 nm from the shortest wavelength within a predetermined wavelength region unless otherwise specified. For example, the average transmittance within the wavelength range of 350 nm to 360 nm is an arithmetic average of transmittance measured at the wavelength of 350 nm, 351 nm, 352 nm, 353 nm, 354 nm, 355 nm, 356 nm, 357 nm, 358 nm, 359 nm and 360 nm.

In the present specification, the term "maximum transmittance" refers to the maximum transmittance when the transmittance of each wavelength is measured while increasing the wavelength by 1 nm from the shortest wavelength within a predetermined wavelength region. For example, the maximum transmittance within the wavelength range of 350 nm to 360 nm is the highest transmittance among transmittances measured at the wavelength of 350 nm, 351 nm, 352 nm, 353 nm, 354 nm, 355 nm, 356 nm, 357 nm, 358 nm, 359 nm and 360 nm.

The term "incident angle" used in the present invention is an angle normal to a surface to be evaluated. For example, a transmittance at an incident angle of 0° of the optical filter means the transmittance for light incident in a direction parallel to the normal of the optical filter surface. Also, a transmittance at an incident angle of 40° is the transmittance for the incident light forming an angle of 40° in the clockwise or the counterclockwise direction with respect to the normal of the optical filter surface. This definition of the incident angle is equally applied to other characteristics such as transmittance.

In the present invention, the term "basic layer for an optical filter" refers to an optical filter before a dielectric film is formed. The basic layer for an optical filter may include other elements of an optical filter except for the dielectric film.

In the present invention, the term "optical filter" refers to a structure where a dielectric film is formed on one or both surfaces of the basic layer for an optical filter.

The basic layer for an optical filter and the optical filter of the present invention exhibit excellent durability and excellent optical properties.

The basic layer for an optical filter and/or the optical filter of the present invention can efficiently and accurately block ultraviolet light near the short-wavelength visible light region and the infrared light near the long-wavelength visible light region, and implement a visible light transmission band with high transmittance.

In the present invention, the term "visible light" means light within a range of approximately 400 nm to 700 nm.

In the present invention, the term "visible light transmission band" means a characteristic of a spectral spectrum having an average transmittance of 75% or more within a wavelength range of 425 nm to 560 nm. In another example, the average transmittance within the wavelength range of 425 nm to 560 nm may be about 77% or more, 79% or more, 81% or more, 83% or more, 85% or more, 87% or more, 89% or more, or 91% or more. The upper limit of the average transmittance is not particularly limited to. For example, the average transmittance may be about 100% or less, 95% or less, 90% or less, 85% or less, 80% or less, or 75% or less.

In the present invention, the term "Tn % cut-on" means the shortest wavelength showing the transmittance of n % within the range of the predetermined wavelength region, and the "Tn % cut-off" means to the longest wavelength showing the transmittance of n % within the range of the predetermined wavelength region. For example, T50% cut-on means the shortest wavelength showing 50% transmittance within the range of a predetermined wavelength range, and T50% cut-off means the longest wavelength showing 50% transmittance within the range of the predetermined wavelength range.

A basic layer for an optical filter in the present invention may include a transparent substrate and a moisture-resistant layer formed on one or both surfaces of the transparent substrate.

In the present invention, the term "moisture-resistant layer" refers to a layer where the basic layer for an optical filter or the optical filter shows the range of the absolute value of $\Delta T_V$ in Equation 1 to be described later.

The basic layer for an optical filter or the optical filter of the present invention may exhibit a low ripple value. In one example, the basic layer for an optical filter or the optical filter may have a ripple value existing within a certain range with respect to an incident angle of 0° in a wavelength region of 450 nm to 560 nm.

The term "ripple value" is the value obtained by finding the difference ($=T_{diff.i}=T_i-T_{ave.i}$)(i=1~n) between the average transmittance ($T_{ave.i}$, i=1 to n) and the actual transmittance ($T_i$, i=1 to n) in the wavelength region (450 nm to 560 nm) first, and then subtracting the minimum value (Min ($T_{diff.\ i}$)) from the maximum value (Max($T_{diff.\ i}$)) of the found difference. In the above, the subscript i, which is determined in the range from 1 to n, is an ordinal number indicating a wavelength. For example, when obtaining the ripple value in the range of 450 nm to 560 nm, 450 nm is designated as a case where i is 1, and then, when the wavelength increases by 1 nm, i also increases by 1. That is, 451 nm is designated as i is 2, and 560 nm is designated as i is 111.

The ripple value is an R value determined according to Equation A below.

$$R = \text{Max}(T_{diff.\,i}) - \text{Min}(T_{diff.\,i}) \qquad \text{[Formula A]}$$

In Formula A, R is the ripple value, Max($T_{diff.\ i}$) is the maximum value among the difference between the average transmittance and the actual transmittance, and Min($T_{diff.\ i}$) is the minimum value among the difference between the average transmittance and the actual transmittance.

The ripple value can be calculated using a cubic spline regression equation.

The upper limit of the ripple value may be about 7%, 6.8%, 6.6%, 6.4%, 6.2%, 6.0%, 5.8%, 5.6%, 5.4%, 5.2%, 5%, 4.8%, 4.6%, 4.4%, 4.2%, 4.0%, 3.8%, 3.6%, 3.4%, 3.2%, 3.0%, 2.9%, 2.8%, 2.7%, 2.6%, 2.5%, 2.4%, 2.3%, 2.2%, 2.1%, 2.0%, 1.9%, 1.8%, 1.7%, 1.6%, or 1.5% and the lower limit of the ripple value may be about 0%, 0.2, 0.4%, 0.6%, 0.8%, 1.0%, 1.2%, 1.4%, 1.6%, 1.8%, 2.0%, 2.2%, or 2.4%. The ripple value may be in a range where it is one of the upper limit or less or less than the upper limit as stated above, or it may be in a range where it is between one of the upper limit or less or less than the upper limit and one of the lower limit or higher of higher than the lower limit as stated above.

The ripple value is a value for the optical filter not including a multi-layered dielectric film (e.g., a layer called IR or AR). That means it is a value for the basic layer for an optical filter. In general, when the multilayer dielectric film does not exist, the ripple phenomenon does not occur severely. However, when the moisture-resistant layer is formed to ensure durability, a ripple phenomenon occurs in many cases due to the characteristics of the moisture-resistant layer. However, in the present invention, it is possible to minimize or prevent the ripple phenomenon in the range stated above.

The basic layer for an optical filter of the present invention may also exhibit excellent durability, and for example, the absolute value of $\Delta T_V$ according to Equation 1 may be within a certain range.

$$\Delta T_V = 100\times(T_{V.f} - T_{V.i})/T_{V.i} \qquad \text{[Equation 1]}$$

In Equation 1, $T_{V.\ f}$ is the average transmittance in the wavelength range of 425 nm to 560 nm of the basic layer for an optical filter confirmed after maintaining the basic layer for an optical filter at a temperature of 85° C. and a relative humidity of 85% for 120 hours, and $T_{V.\ i}$ is the average transmittance in the wavelength range of 425 nm to 560 nm of the basic layer for an optical filter before maintaining at the temperature and the humidity.

The upper limit of the absolute value of $\Delta T_V$ may be about 30%, 28%, 26%, 24%, 22%, 20%, 18%, 16%, 14%, 12%, 10%, 8%, 6%, 4%, 2%, 1.5%, 1%, 0.8%, 0.6%, or 0.4%. The $\Delta T_V$ may be positive or negative. The lower limit of the absolute value of $\Delta T_V$ may be, for example, about 0%, 0.5%, 1%, 1.5%, 2%, 2.5%, 3%, 3.5%, 4%, 4.5%, 5%, or 5.5%. The absolute value of $\Delta T_V$ may be in a range where it is one of the upper limit or less or less than the upper limit as stated above, or it may be in a range where it is between one of the upper limit or less or less than the upper limit and one of the lower limit or higher of higher than the lower limit as stated above. The above characteristics may also be characteristics for the basic layer for an optical filter: the optical filter not including the multi-layered dielectric film (e.g., so-called IR or AR layers).

The basic layer for an optical filter of the present invention may exhibit excellent optical properties as a whole while satisfying the low ripple value and excellent durability as described above. For example, the basic layer for an optical filter may exhibit a transmission band having a T50% cut-on wavelength in the range of about 390 nm to 430 nm. The T50% cut-on wavelength is the shortest wavelength among wavelengths showing a transmittance of 50% within a wavelength range of 300 nm to 700 nm. One or two or more wavelengths showing the transmittance of 50% may exist within the range of 390 nm to 430 nm. If one wavelength exists, that is the one that becomes the T50% cut-on wavelength. If two or more wavelengths exist, the shortest one among them becomes the T50% cut-on wavelength. The lower limit of the T50% cut-on wavelength may be about 390 nm, 392 nm, 394 nm, 396 nm, 398 nm, 400 nm, 402 nm, 404 nm, 406 nm, 408 nm, 410 nm, or 412 nm, and the upper limit of T50% cut-on wavelength may be about 430 nm, 428 nm, 426 nm, 424, 422 nm, 420 nm, 418 nm, 416 nm, 414 nm, 412 nm, or 410 nm. The T50% cut-on wavelength may be in a range where it is between one of the upper limit or less or less than the upper limit and one of the lower limit or higher of higher than the lower limit as stated above.

The basic layer for an optical filter may exhibit a transmission band having a T50% cut-off wavelength in the range of about 590 nm to 660 nm. The T50% cut-off wavelength is the longest wavelength among wavelengths showing a transmittance of 50% within a wavelength range of 500 nm to 800 nm. One or two or more wavelengths showing the transmittance of 50% may exist within the range of 500 nm to 800 nm, and if one is present, the longest wavelength becomes the T50% the cut-off wavelength. If two or more wavelengths exist, the longest one among them becomes the T50% cut-off wavelength. The lower limit of the T50% cut-off wavelength may be about 590 nm, 592 nm, 594 nm, 596 nm, 598 nm, 600 nm, 602 nm, 604 nm, 606 nm, 608 nm, 610 nm, 612 nm, 614 nm, 616 nm, 618 nm, 620 nm, 622 nm, 624 nm, 626 nm, 628 nm, or 630, and the upper limit of the T50% cut-off wavelength may be about 660 nm, 658 nm, 656 nm, 654 nm, 652 nm, 650 nm, 648 nm, 646 nm, 644 nm, 642 nm, 640 nm, 638 nm, 636 nm, 634 nm, 632 nm, 630 nm, 628 nm, 626 nm, 624 nm, 622 nm, 620 nm, or 618 nm or less. The T50% cut-off wavelength may be in a range where it is between one of the upper limit or less or less than the upper limit and one of the lower limit or higher of higher than the lower limit as stated above.

The optical filter may have a transmission band exhibiting an average transmittance in a certain range within a wavelength range of 425 nm to 560 nm. The lower limit of the average transmittance within a wavelength range of 425 nm to 560 nm may be about 75%, 77%, 79%, 81%, 83%, 85%, 87%, 89%, or 91%, and the upper limit of the average transmittance within a wavelength range of 425 nm to 560 nm may be about 98%, 96%, 94%, 92%, 90%, 88%, 86%, 84%, or 82%. The average transmittance within a wavelength range of 425 nm to 560 nm may be in a range where it is one of the lower limit or higher or higher than the lower limit as stated above, or it may be in a range where it is between one of the upper limit or less or less than the upper limit and one of the lower limit or higher of higher than the lower limit as stated above.

The optical filter of the present invention may have a transmission band exhibiting a maximum transmittance in a certain range within a wavelength range of 425 nm to 560 nm. The lower limit of the maximum transmittance may be about 79%, 81%, 83%, 85%, 87%, 89%, 91%, 93%, or 95% and the upper limit of the maximum transmittance may be about 100%, 98%, 96%, 94%, 92%, 90%, or 88%. The maximum transmittance within a wavelength range of 425 nm to 560 nm may be in a range where it is one of the lower limit or higher or higher than the lower limit as stated above, or it may be in a range where it is between one of the upper limit or less or less than the upper limit and one of the lower limit or higher of higher than the lower limit as stated above.

The basic layer for an optical filter of the present invention may have a transmission band exhibiting an average transmittance in a certain range within a wavelength range of 350 nm to 390 nm. The lower limit of the average transmittance may be about 0%, 0.5%, 1%, 1.5%, or 2%, and the upper limit of the average transmittance may be about 6%, 5.5%, 5%, 4.5%, 4%, 3.5%, 3%, or 2.5%. The average transmittance within a wavelength range of 350 nm to 390 nm may be in a range where it is one of the upper limit or less or less than the upper limit as stated above, or it may be in a range where it is between one of the upper limit or less or less than the upper limit and one of the lower limit or higher or higher than the lower limit as stated above.

The basic layer for an optical filter of the present invention may have a transmission band exhibiting a maximum transmittance in a certain range within a wavelength range of 350 nm to 390 nm. The lower limit of the maximum transmittance may be about 0%, 0.5%, 1%, 1.5%, 2%, 2.5%, 3%, 3.5%, 4%, 4.5%, 5%, 5.5%, 6%, or 6.5% and its upper limit may be about 10%, 9.5%, 9%, 8.5%, 8%, 7.5%, 7%, 6.5%, 6%, 5.5%, 5%, 4.5%, 4%, 3.5%, 3%, 2.5%, or 2%. The maximum transmittance within a wavelength range of 350 nm to 390 nm may be in a range where it is one of the upper limit or less or less than the upper limit as stated above, or it may be in a range where it is between one of the upper limit or less or less than the upper limit and one of the lower limit or higher or higher than the lower limit as stated above.

The basic layer for an optical filter of the present invention may have a certain transmittance at a wavelength of 700 nm. The lower limit of the transmittance may be about 0%, 0.2%, 0.4%, 0.6%, or 0.8% and its upper limit may be about 4%, 3.8%, 3.6%, 3.4%, 3.2%, 3.0%, 2.8%, 2.6%, 2.4%, 2.2%, 2.0%, 1.8%, 1.6%, 1.4%, 1.2%, or 1.0%. The transmittance at the wavelength of 700 nm may be in a range where it is one of the upper limit or less or less than the upper limit as stated above, or it may be in a range where it is between one of the upper limit or less or less than the upper limit and one of the lower limit or higher or higher than the lower limit as stated above.

The basic layer for an optical filter of the present invention may have a transmission band exhibiting an average transmittance in a certain range within a wavelength range of 700 nm to 800 nm. The lower limit of the average transmittance may be about 0%, 0.1%, 0.3%, 0.4%, or 0.5% and its upper limit may be about 2%, 1.8%, 1.6%, 1.4%, 1.2%, 1.0%, 0.8%, or 0.6%. The average transmittance within a wavelength range of 700 nm to 800 nm may be in a range where it is one of the upper limit or less or less than the upper limit as stated above, or it may be in a range where it is between one of the upper limit or less or less than the upper limit and one of the lower limit or higher or higher than the lower limit as stated above.

The basic layer for an optical filter of the present invention may have a transmission band exhibiting a maximum transmittance in a certain range within a wavelength range of 700 nm to 800 nm. The lower limit of the maximum transmittance may be about 0%, 0.2%, 0.4%, 0.6%, or 0.8% and its upper limit may be about 4%, 3.8%, 3.6%, 3.4%, 3.2%, 3.0%, 2.8%, 2.6%, 2.4%, 2.2%, 2.0%, 1.8%, 1.6%, 1.4%, 1.2%, or 1.0%. The maximum transmittance within a wavelength range of 700 nm to 800 nm may be in a range where it is one of the upper limit or less or less than the upper limit as stated above, or it may be in a range where it is between one of the upper limit or less or less than the upper limit and one of the lower limit or higher or higher than the lower limit as stated above.

The basic layer for an optical filter of the present invention may have a transmission band exhibiting an average transmittance in a certain range within a wavelength range of 800 nm to 1,000 nm. The lower limit of the average transmittance may be about 0%, 0.1%, 0.3%, 0.4%, or 0.5% and its upper limit may be about 6%, 5.5%, 5.0%, 4.5%, 4.0%, 3.5%, 3.0%, 2.5%, 2.0%, 1.5%, 1.0%, 0.8%, 0.6%, 0.4%, or 0.2%. The average transmittance within a wavelength range of 800 nm to 1,000 nm may be in a range where it is one of the upper limit or less or less than the upper limit as stated above, or it may be in a range where it is between one of the upper limit or less or less than the upper limit and one of the lower limit or higher or higher than the lower limit as stated above.

The basic layer for an optical filter of the present invention may have a transmission band exhibiting a maximum transmittance in a certain range within a wavelength range of 800 nm to 1,000 nm. The lower limit of the maximum transmittance may be about 0%, 0.5%, 1.0%, 1.5%, 2.0%, 2.5%, 3.0%, 3.5%, 4.0%, 4.5%, 5.0%, 5.5% or more, or 6.0% and its upper limit may be about 10%, 9.5%, 9.0%, 8.5%, 8.0%, 7.5%, 7.0%, or 6.5%. The maximum transmittance within a wavelength range of 800 nm to 1,000 nm may be in a range where it is one of the upper limit or less or less than the upper limit as stated above, or it may be in a range where it is between one of the upper limit or less or less than the upper limit and one of the lower limit or higher or higher than the lower limit as stated above.

The basic layer for an optical filter of the present invention may have a transmission band exhibiting an average transmittance in a certain range within a wavelength range of 1,000 nm to 1,050 nm. The lower limit of the average transmittance may be about 0%, 0.5%, 1%, or 1.5% and its upper limit may be about 11.5%, 11.0%, 10.5%, 10.0%, 9.5%, 9.0%, 8.5%, 8.0%, 7.5%, 7.0%, 6.5%, 6.0%, 5.5%, 5.0%, 4.5%, 4%, 3.5%, 3%, 2.5%, 2%, 1.5%, 1%, 0.8%, 0.6%, or 0.4%, or 0.2%. The average transmittance within a wavelength range of 1,000 nm to 1,050 nm may be in a range where it is one of the upper limit or less or less than the upper limit as stated above, or it may be in a range where it is between one of the upper limit or less or less than the upper limit and one of the lower limit or higher or higher than the lower limit as stated above.

The basic layer for an optical filter of the present invention may have a transmission band exhibiting a maximum transmittance in a certain range within a wavelength range of 1,000 nm to 1,050 nm. The lower limit of the maximum transmittance may be about 0%, 0.5%, 1%, or 1.5% and its upper limit may be about 12%, 11%, 10%, 9%, 8%, 7%, 6%, 5%, 4%, 3%, 2%, 1.5%, 1%, 0.8%, 0.6%, 0.4%, or 0.2%. The maximum transmittance within a wavelength range of 1,000 nm to 1,050 nm may be in a range where it is one of the upper limit or less or less than the upper limit as stated above, or it may be in a range where it is between one of the upper limit or less or less than the upper limit and one of the lower limit or higher or higher than the lower limit as stated above.

The basic layer for an optical filter of the present invention may have a certain transmittance at a wavelength of 1,050 nm. The lower limit of the transmittance may be about 0%, 0.5%, 1%, or 1.5% and its upper limit may be about 13%, 12%, 11%, 10%, 9%, 8%, 7%, 6%, 5%, 4%, 3%, 2%, 1.5%, 1%, 0.5%, or 0.1%. The transmittance at the wavelength of 1,050 nm may be in a range where it is one of the upper limit or less or less than the upper limit as stated above, or it may be in a range where it is between one of the upper limit or less or less than the upper limit and one of the lower limit or higher or higher than the lower limit as stated above.

The basic layer for an optical filter of the present invention may exhibit any one of the above-described optical properties or a combination of two or more, and suitably satisfy all of the above-described optical properties. The transmittance characteristic of the basic layer for an optical filter is a characteristic where the basic layer for an optical filter does not include a dielectric film to be described later. It is possible to provide an optical filter that exhibits suitable and very precisely controlled optical properties with excellent durability even in a simple and thin structure of adapting such a basic layer for an optical filter.

Figure 2:
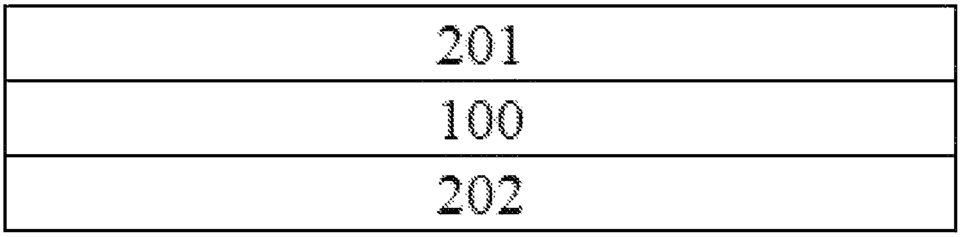

As described above, the basic layer for an optical filter comprises a transparent substrate and a moisture-resistant layer formed on one or both surfaces of the transparent substrate. FIGS. 1 and 2 disclose a structure where the moisture-resistant layers 200, 201, and 202 are formed on one or both surfaces of the transparent substrate 100. The type of the transparent substrate utilized for the basic layer for an optical filter is not particularly limited, and an appropriate type may be selected and used.

The term "transparent substrate" refers to a substrate having a property of transmitting visible light, and for example, it may refer to a substrate having an average transmittance of 70% or more in a wavelength range of about 425 nm to 560 nm. The lower limit of the average transmittance of the transparent substrate may be about 70%, 75%, 80%, or 85%, and its upper limit may be about 95% or 90%. The average transmittance within a wavelength range of 425 nm to 560 nm may be in a range where it is one of the lower limit or higher or higher than the lower limit as stated above, or it may be in a range where it is between one of the upper limit or less or less than the upper limit and one of the lower limit or higher or higher than the lower limit as stated above.

As the transparent substrate, a substrate made of various known materials can be utilized as long as it exhibits the above transmittance and exhibits physical properties such as appropriate rigidity for the substrate. For example, a substrate made of an inorganic material such as a glass or a crystal, or an organic material such as a resin can be used.

As a resin material that can be used for the transparent substrate, polyester such as PET (poly(ethylene terephthalate)) or PBT (poly(butylene terephthalate)), polyolefin such as polyethylene, polypropylene, or EVA (ethylene-vinyl acetate copolymer), acrylic polymer such as norbornene or PMMA (poly(methyl methacrylate)), urethane polymer, vinyl chloride polymer, fluoro polymer, polycarbonate, polyvinyl butyral, polyvinyl alcohol or polyimide may be exemplified, but the present invention is not limited thereto.

As a glass material which can be used for the transparent substrate, a soda-lime glass, a borosilicate glass, an alkali free glass, and a quartz glass, etc. Crystal material that can be used for the transparent substrate includes a quartz, a niobic acid lithium or a birefringent crystal such as sapphire. The thickness of the transparent substrate may be adjusted within a range of, for example, about 0.03 mm to 5 mm, but is not limited thereto.

A substrate having a function of absorbing light in the near-infrared and/or near-ultraviolet region may be utilized. Such a substrate may be referred to as an infrared absorption substrate.

Such a substrate is publicly known, and, for example, a so-called infrared absorption glass is known as material having the above functions. Such glass is known as an absorption type glass where material such as CuO is added to a fluorophosphate-based glass or a phosphate-based glass.

In the present invention, a CuO containing fluorophosphate glass substrate or a CuO containing phosphate glass substrate may be used as the infrared absorption substrate which is the transparent substrate. For the phosphate glass, a silicophosphate glass where a part of the structure of the glass is composed of $SiO_2$ is also included.

In a case where the absorption type glass is used as a transparent substrate, the transmittance of the absorption type glass in the near-infrared region can be lowered by adjusting the concentration of CuO additive or the thickness of the substrate. Accordingly, it is possible to improve light-shielding properties against near-infrared light. Such absorption-type glass is publicly known, for example, a glass disclosed in Korean Patent Registration No. 10-2056613 or other commercially available absorption-type glass (e.g., commercially available products from Hoya, SCHOTT, and PTOT) may be used.

A phosphate-based glass containing CuO is known to have very excellent infrared absorption performance, and thus an optical filter exhibiting the above-described transmittance characteristics in a wavelength region of 800 nm to 1,000 nm alone can be provided. However, such glass has a problem in that its durability is greatly deteriorated and optical properties are greatly damaged when exposed to high humidity and/or high temperature conditions. Now, in the present invention, it is possible to utilize the advantages of the glass while solving the disadvantages of the glass through the application of an appropriate moisture-resistant layer.

An optical filter may include a moisture-resistant layer formed on one or both sides of the transparent substrate. The definition of the moisture-resistant layer is as described above. For the moisture-resistant layer, a layer of material capable of suppressing penetration of moisture into the transparent substrate may be utilized.

For one example, the moisture-resistant layer may use as the same material as the above where it may include one, two or more species selected from a group consisted of polysilazane, silica ($SiO_x$), silane compound, COP (Cyclic Olefin Polymer), polysilsesquioxane, polyarylate-based resin, polyisocyanate-based resin, polyimide-based resin, polyetherimide-based resin, polyamideimide-based resin, polyacrylic resin, polycabonate-based resin, polyethylene phthalate-based resin, epoxy resin, urethane resin, silicone resin, polysiloxane, polysilane, and fluoro resin compound. The moisture-resistant layer may include necessary additives for the materials above, for example, curing agents or other additives such as surfactants.

The material of the moisture-resistant layer may be selected to secure the above-mentioned optical characteristics (e.g., low ripple value and/or transmittance characteristics, etc.) while showing the excellent moisture resistance property. For one example, as the moisture-resistant layer, a layer including polysilazane and silane compound among the materials may be applied. The moisture-resistant layer may include the material stated above or a material formed from the material stated above. In one example, the moisture-resistant layer may be a cured layer of a mixture including the polysilazane and the silane compound. Through the application of such a material, it is possible to provide an optical filter that maintains excellent optical properties while securing desired moisture resistance.

In another example, the polysilazane used in the present invention may include a unit represented by the following Chemical Formula 1.

[Chemical Formula 1]

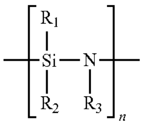

In Chemical Formula 1, $R_1$, $R_2$ and $R_3$ may each independently represent a hydrogen atom, an alkyl group, an alkenyl group, an alkynyl group, an aryl group, an alkylsilyl group, an alkylamide group, or an alkoxy group. The alkyl group may be an alkyl group having 1 to 20 carbon numbers, 1 to 16 carbon numbers, 1 to 12 carbon numbers, 1 to 8 carbon numbers, or 1 to 4 carbon numbers. The alkyl group may be linear, branched or cyclic. The alkyl group may be optionally substituted with one or more substituents.

The alkenyl group may be an alkenyl group having 2 to 20 carbon numbers, 2 to 16 carbon numbers, 2 to 12 carbon numbers, 2 to 8 carbon numbers, or 2 to 4 carbon numbers. The alkenyl group may be linear, branched or cyclic, and may be optionally substituted with one or more substituents.

The alkynyl group may be an alkynyl group having 2 to 20 carbon numbers, 2 to 16 carbon numbers, 2 to 12 carbon numbers, 2 to 8 carbon numbers, or 2 to 4 carbon numbers. The alkynyl group may be linear, branched or cyclic, and may be optionally substituted with one or more substituents.

The aryl group may be a compound including a structure where a benzene ring or two or more benzene rings connected or a condensed or bonded structure while sharing one or two or more carbon numbers, or a monovalent moiety derived from its derivative. The range of the aryl group may include a functional group commonly referred to as an aryl group as well as a so-called aralkyl group or an arylalkyl group. The aryl group may be, for example, an aryl group having 6 to 25 carbon numbers, 6 to 21 carbon numbers, 6 to 18 carbon numbers, or 6 to 12 carbon numbers. Examples of the aryl group may also include a phenyl group, a dichlorophenyl group, a chlorophenyl group, a phenylethyl group, a phenylpropyl group, a benzyl group, a tolyl group, a xylyl group, or a naphthyl group.

The alkoxy group may be an alkoxy group having 1 to 20 carbon numbers, 1 to 16 carbon numbers, 1 to 12 carbon numbers, 1 to 8 carbon numbers, or 1 to 4 carbon numbers. The alkoxy group may be linear, branched or cyclic. In addition, the alkoxy group may be optionally substituted with one or more substituents.

The number n in the Chemical Formula 1 is an arbitrary number unless its range is particularly limited. In general, the number n in the Chemical Formula 1 is a number in a range of 10 to 100,000.

If a unit represented by Chemical Formula 1 is included, specific types of polysilazane are not particularly limited. For one example, in consideration of such as the density of the modified polysilazane layer, for polysilazane of the present invention, polysilazane including the unit of Chemical Formula 1 and also having $R_1$ to $R_3$ being all hydrogen atoms, such as perhydropolysilazanes, may be used. Such polysilazane is publicly known in various ways, and in the present invention, an appropriate type of polysilazane known as described above may be selected and used.

A moisture-resistant layer may include a silane compound together with the polysilazane. Although the reason is not clearly known, if only any one of polysilazane or silane compound is utilized, there is a strong tendency that the optical filter of the present invention does not exhibit a suitable effect. In general, polysilazane is known to be modified alone thereby exhibiting barrier properties against moisture, but in the present invention, polysilazane alone does not form a suitable moisture-resistant layer in many cases. Although the reason is clearly unknown, it can be speculated that there may be some interaction involved with the adapting transparent substrate.

The type of the silane compound is not particularly limited, for example a silane compound known as a so-called silane coupling agent in the industry may be used. The type of the silane compound is not particularly limited, but, for example, a silane compound represented by the following Chemical Formula 2 may be utilized.

[Chemical Formula 2]

$$X_nSiY_{(4-n)}$$

In Chemical Formula 2, X is a substituent bonded to a silicon atom. The X represents, for example, an alkenyl group, an epoxy group (e.g., a glycidyl group, a glycidoxyalkyl group, or an alicyclic epoxy group), an amino group, a (meth) acryl group, a (meth) acryloyloxy group, a (meth) acryloyloxyalkyl group, a mercapto group, a mercaptoalkyl group, a ureido group, an isocyanate group or an isocyanatoalkyl group, etc, or a functional group including the group described above. The X may be the same or different in the Chemical Formula 2 if the X is plural.

In the Chemical Formula 2, Y is a substituent bonded to a silicon atom. The Y may be an alkyl group or an alkoxy group. The Y may be the same or different in the Chemical Formula 2 if the Y is plural. In the Chemical Formula 2, the number n is a number within the range of 1 to 3.

In the definition of the Chemical Formula 2, specific types of the alkyl group, the alkenyl group, and the alkoxy group are the same as those described in the Chemical Formula 1. The compound of the Chemical Formula 2 may include at least one, for example, 1 to 3 alkoxy groups as Y. In the Chemical Formula 2, the number n may be 1 or 2.

A moisture-resistant layer may be a layer including the polysilazane and the silane compound, or a layer including a reactant of a mixture of containing them.

In this case where a layer containing the polysilazane and the silane compound or a layer containing the mixture of them, the lower limit of the total weight of the polysilazane and the silane compound may be about 55 weight %, 60 weight %, 65 weight %, 70 weight %, 75 weight %, 80 weight %, 85 weight %, 90 weight %, or 95 weight % with respect to the entire layer or the entire weight of the mixture of them and its upper limit may be about 100 weight % or 99 weight % with respect to the entire layer or the entire weight of the mixture of them. The total weight may be in a range where it is one of the lower limit or higher or higher than the lower limit as stated above, or it may be in a range where it is between one of the upper limit or less or less than the upper limit and one of the lower limit or higher or higher than the lower limit as stated above. Consequently, the layer or the mixture of them may contain substantially the polysilazane and a silane compound as a main component. The amount of the polysilazane and the silane compound is a value obtained by excluding the solvent when the layer or mixture includes a solvent.

In the layer or the mixture, the lower limit of parts by weight with respect to 100 parts by weight of the polysilazane of the silane compound may be about 1 parts by weight, 5 parts by weight, 10 parts by weight, 15 parts by weight, 20 parts by weight, 25 parts by weight, or 30 parts by weight, and its upper limit may be about 100 parts by weight, 95 parts by weight, 90 parts by weight, 85 parts by weight, 80 parts by weight, 75 parts by weight, 70 parts by weight, 65 parts by weight, 60 parts by weight, 55 parts by weight, 50 parts by weight, 45 parts by weight, 40 parts by weight, 35 parts by weight, or 30 parts by weight. Its parts by weight may be in a range where it is between one of the upper limit or less or less than the upper limit and one of the lower limit or higher or higher than the lower limit as stated above.

In another example, for the moisture-resistant layer, a layer comprising polysiloxane among materials mentioned above may be applied. The moisture-resistant layer may include materials mentioned above, or material which is formed from the materials mentioned above. Polysiloxane is a polymer comprising siloxane units linked by siloxane bonds (—Si—O—Si—) as known in the art, and at least one of the silicon atoms in the siloxane units may have an organic group linked to. Such polymers can be formed by curing so-called hydrosilylation-type materials or condensation-cured materials, as is known in the art. The application of these materials can provide optical filters that achieve the desired moisture resistance while maintaining good optical properties.

In one example, polysiloxane having an average unit of 3 can be used as the above polysiloxane. The term average unit of polysiloxane refers to a number of moles of all silicon atoms in the polysiloxane being equal to 1, and a number of moles of functional groups and oxygen atoms in the polysiloxane being converted to this reference. Such average unit may be for a single molecule of polysiloxane or a mixture of two or more molecules of polysiloxanes. Consequently, if a single molecule of polysiloxane is present in the moisture-resistant layer, the average unit is for the single molecule of polysiloxane, and if two or more polysiloxanes are present, the average unit is for the mixture of the two or more molecules of polysiloxanes.

[Chemical Formula 3]

$$R_aSiO_{(4-a)/2}$$

In Chemical Formula 3, R is a functional group bonded to a silicon atom in the polysiloxane. Examples of such functional groups include hydrogen atoms, an alkyl group, an alkenyl group, an alkynyl group, an aryl group, an alkylsilyl group, an alkylamide group, an alkoxyl group, or a functional moiety groups.

Specific types of alkyl, alkenyl, alkynyl, aryl, and alkoxy groups are as defined in the Chemical Formula 1.

Meanwhile, examples of the functional moiety group are an epoxy group (e.g., a glycidyl group, a glycidoxyalkyl group, or an alicyclic epoxy group), an amino group, a (meth)acrylic group, a (meth)acryloyloxy group, a (meth)acryloyloxyalkyl group, a mercapto group, a mercaptoalkyl group, a ureido group, an isocyanate group, a hydroxy group, or an isocyanatoalkyl group, or a functional group comprising any of the above.

Specific types of alkyl groups in the above functional moiety group are as described in the Chemical Formula 1.

In polysiloxane having the average unit of the Chemical Formula 3, R may be plural, and in this case, the plurality of Rs may be the same or different.

Meanwhile, in polysiloxane having the average unit of the Chemical Formula 3, the R comprises at least the functional moiety group. That is, in polysiloxane having the average unit of the Chemical Formula 1, the R is plural, and in this case, at least one of the plurality of Rs is the functional moiety group.

In the average unit of the Chemical Formula 3, a is a number of moles of the functional group R converted from the reference where the number of moles of all silicon atoms contained in the polysiloxane is equal to one mole. The lower limit of the a may be about 0.01, 0.05, 0.1, 0.5, 1, 1.5, or 2, and the upper limit may be about 10, 9, 8, 7, 6, 5, 4, 3, 2, 1.5, 1, 0.5, or 0.05. The a may be in a range where it is between one of the upper limit or less or less than the upper limit and one of the lower limit or higher or higher than the lower limit as stated above.

Polysiloxane having the average unit of the Chemical Formula 3 may have a constant level of weight average molecular weight. The weight average molecular weight may be in the range of, for example, about 1,000 g/mol to 1,000,000 g/mol.

The polysiloxane may be formed in a known manner. For example, the polysiloxane may be formed by applying a material selected from known polysiloxane materials to represent the average unit.

In the above case, the lower limit of the weight percentage of the polysiloxane in the moisture-resistant layer or in the material forming it may be about 55%, 60%, 65%, 70%, 75%, 80%, 85%, 90% or 95%, based on the weight of the entire moisture-resistant layer or the entire material, and its upper limit may be about 100% or 99%, based on the weight of the entire moisture-resistant layer or the entire material. The weight percentage may be in a range where it is one of the lower limit or higher or higher than the lower limit as stated above, or it may be in a range where it is between one of the upper limit or less or less than the upper limit and one of the lower limit or higher or higher than the lower limit as stated above. In other words, the moisture-resistant layer or material may comprise substantially the polysiloxane as a main component. The content of the polysiloxane is the value determined excluding the solvent if the moisture-resistant layer or material includes a solvent.

There is no particular limitation on a method of forming a moisture-resistant layer including such a component. For example, the moisture-resistant layer may be formed by coating compositions including the materials stated above on the transparent substrate, and if necessary, a drying process after the coating, or a material modification or curing process may be performed.

If necessary, the material in the coating process may contain a suitable solvent. There is no particular limitation on the kind of solvent that can be utilized, but for example, hydrocarbon solvent such as aliphatic hydrocarbon, alicyclic hydrocarbon, and aromatic hydrocarbon, halogenated hydrocarbon solvent, or ether such as aliphatic ether and alicyclic hydrocarbon ether can be used.

The moisture-resistant layer may be formed to an appropriate thickness depending on the purpose. For example, the lower limit of the thickness of the moisture-resistant layer may be about 0.01 μm, 0.03 μm, 0.05 μm, 0.07 μm, or 0.09 μm, and its upper limit may be about 9 μm, 8 m, 7 μm, 6 μm, 5 μm, 4 μm, 3 μm, 2 μm, 1 μm, 0.95 μm, 0.9 μm, 0.85 μm, 0.8 μm, 0.75 μm, 0.7 μm, 0.65 μm 0.6 μm, 0.55 μm, 0.5 μm, 0.45 μm, 0.4 μm, 0.35 μm, 0.3 μm, 0.25 μm, 0.2 μm, 0.15 μm, 0.14 μm, 0.13 μm, 0.12 μm, 0.11 μm, or 0.1 μm. The thickness may be in a range where it is between one of the upper limit or less or less than the upper limit and one of the lower limit or higher or higher than the lower limit as stated above. The moisture-resistant layer may exhibit excellent effect in the thickness range described above.

The moisture-resistant layer of the present invention may be in contact with the transparent substrate in one example. In this case, the moisture-resistant layer may exhibit excellent adhesion to the transparent substrate. In one example, the adhesion of the moisture-resistant layer to the transparent substrate may be 3B or more, 4B or more, or 5B or more. In another example, the adhesion strength may be 3B to 5B, 4B to 5B, or 5B. The adhesion strength may be measured according to ASTM D3359 standard, and a specific measuring method is described in Embodiments of the specification in the present invention. In addition, the maximum value of the adhesion strength that can be measured according to the above standard is 5B.

The basic layer for an optical filter of the present invention may further include various optional layers as long as the transparent substrate and the moisture-resistant layer are basically included. For example, the optical filter may further include an absorption layer formed on one or both surfaces of the transparent substrate and/or the moisture-resistant layer. For example, the absorption layer is a light absorption layer which is a layer absorbing light within the wavelength range of at least part of an infrared and/or an ultraviolet region. One or two or more layers of the absorption layer may be formed on the basic layer for an optical filter.

Figure 3:
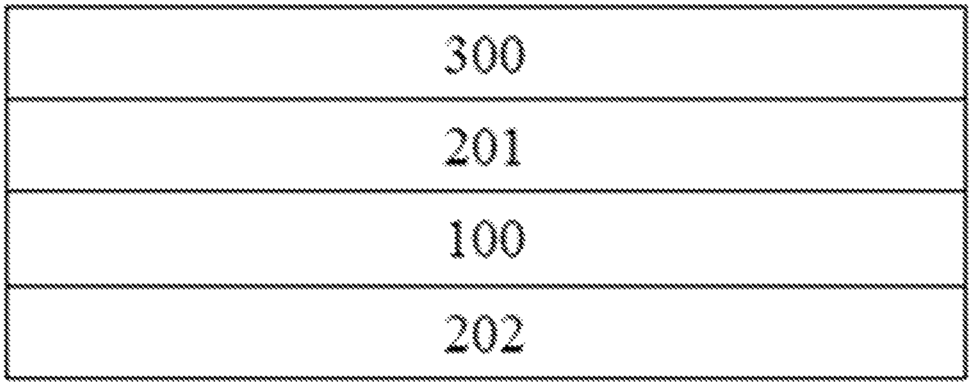
FIGS. 3 and 4 are drawings showing another exemplary stacked structure of an optical filter, respectively.

FIG. 3 is a drawing showing a case where the light absorption layer 300 is formed on the moisture-resistant layer 201 of the basic layer for an optical filter of FIG. 2. For one example, the absorption layer may be an infrared absorption layer and/or an ultraviolet absorption layer.

The absorption layer may also be a layer having both infrared absorption and ultraviolet absorptivity. These layers are usually layers including an absorbent (pigment, dye, etc.) and a transparent resin, and may be applied to implement a sharper transmittance band by cutting light in the near-ultraviolet region and/or the near-infrared region.

In one example, the ultraviolet absorption layer may be designed to exhibit an absorption maximum in a wavelength region of about 300 nm to 390 nm, and the infrared absorption layer may be designed to exhibit an absorption maximum in a wavelength region of 600 nm to 800 nm. In one example, when the light absorption layer is a layer exhibiting both ultraviolet and infrared absorptivity, the light absorption layer can be designed to simultaneously exhibit an absorption band in a wavelength region of about 300 nm to 390 nm and an absorption band in a wavelength region of 600 nm to 800 nm.

The infrared absorption layer and the ultraviolet absorption layer may be configured as one layer or may be configured as separate layers, respectively. For example, one layer may be designed to exhibit both the absorption maximum of the ultraviolet absorption layer and the absorption maximum of the infrared absorption layer, or two layers showing the respective absorption maximum may be formed. In addition, a plurality of infrared absorption layers and/or ultraviolet absorption layers may be existed.

Each absorption layer may contain only one kind of absorbent, and may contain two or more kinds of absorbents for proper cutting of infrared and/or ultraviolet, if necessary. For example, the infrared absorption layer may include at least a first absorbent having an absorption maximum wavelength in a range of 700 nm to 720 nm, and a full width at half maximum in a range of 50 nm to 60 nm; a second absorbent having an absorption maximum wavelength in the range of 730 nm to 750 nm, a half width in the range of 60 nm to 70 nm, and a third absorbent having an absorption maximum wavelength in the range of 760 nm to 780 nm, and a full width at half maximum in the range of 90 nm to 100 nm. Furthermore, the ultraviolet absorption layer may include at least a first absorbent having an absorption maximum wavelength in a range of 340 nm to 350 nm and a second absorbent having an absorption maximum wavelength in a range of 360 nm to 370 nm.

Material constituting the absorption layer and the construction method for the absorption layer are not particularly limited, and known materials and construction methods may be applied. Usually, the absorbent layer is formed using a material in which an absorbent (dye or pigment, etc.) capable of exhibiting a desired maximum absorption is blended with a transparent resin.

For example, as the ultraviolet absorbent, a known absorbent exhibiting an absorption maximum in a wavelength region of about 300 nm to 390 nm may be utilized, and for example, it may include ABS 407 manufactured by Exiton; UV381A, UV381B, UV382A, UV386A, and VIS404A from QCR Solutions Corp.; HW Sands Corp.'s ADA1225, ADA3209, ADA3216, ADA3217, ADA3218, ADA3230, ADA5205, ADA3217, ADA2055, ADA6798, ADA3102, ADA3204, ADA3210, ADA2041, ADA2323201, ADA3202, ADA3215, ADA3225, ADA3268, ADA3202, ADA3215, ADA26, ADA3219, ADA3, ADA7226, ADA4634, ADA3213, ADA3227, ADA5922, ADA5950, ADA6752, ADA7130, ADA8212, ADA2984, ADA2999, ADA3220, ADA3228, ADA3235, ADA3240, ADA3211, ADA3221, ADA5220, and ADA7158; CRYSTALYN Corp.'s DLS 381B, DLS 381C, DLS 382A, DLS 386A, DLS 404A, DLS 405A, DLS 405C, and DLS 403A, but it is not limited thereto.

As the infrared absorbent, an appropriate dye or pigment exhibiting an absorption maximum in a wavelength region of 600 nm to 800 nm may be used. For example, squarylium-based dye, cyanine-based compound, phthalocyanine-based compound, naphthalocyanine-based compound or dithiol metal complex-based compound may be used, but it is not limited thereto.

The transparent resin for the absorption layer may also be used a known resin. For example, one or more of cyclic olefin resin, polyarylate resin, polysulfone resin, polyether sulfone resin, polyparaphenylene resin, polyarylene ether phosphine oxide resin, polyimide resin, polyetherimide resin, polyamideimide resin, acrylic resin, polycarbonate resin, polyethylene naphthalate resin, and various organic-inorganic hybrid resins may be used.

In addition to the above-described layers, the basic layer for an optical filter may be added with various necessary layers within a range that does not impair the desired effect.

The present invention also relates to an optical filter. The optical filter may include the basic layer for an optical filter and a dielectric film formed on one or both surfaces of the basic layer for an optical filter. The dielectric film may be formed on one or both surfaces of the transparent substrate of the basic layer for an optical filter.

Figure 4:
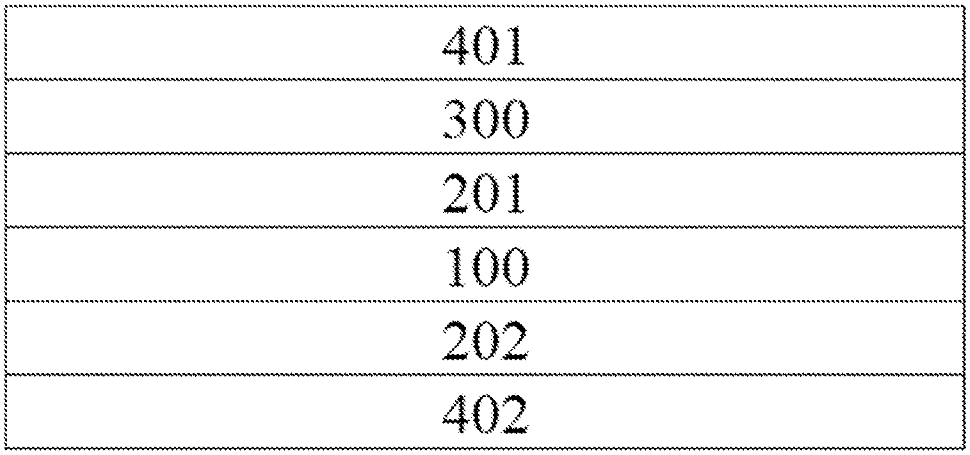

FIG. 4 is an exemplary structure of an optical filter, and shows a case where the dielectric films 401 and 402 are formed on both surfaces of the basic layer for an optical filter of FIG. 3.

The dielectric layer may have a multilayer structure including at least a first sub-layer and a second sub-layer having different refractive indices. In one embodiment, the first and second sub-layers may have different refractive indices, and the first sub-layer may have a higher refractive index than the second sub-layer. The dielectric layer may include a structure where the first and second sub-layers are alternately repeatedly stacked.

In general, a dielectric film is a film constituted by repeatedly stacking a dielectric material with a low refractive index and a dielectric material with a high refractive index, and is used to form a so-called IR reflective layer and an AR (anti-reflection) layer. A dielectric film for forming the publicly known IR reflective layer or the AR layer may be utilized in the present invention.

In one example, in the present invention, a dielectric film capable of further improving the optical properties of the optical filter may be utilized as a layer different from the known dielectric film as described above. Such a dielectric film can be utilized because, as described above, the optical filter of the present invention exhibits the characteristics of the filter even with a structure including a transparent substrate and a moisture-resistant layer alone.

Consequently, by adjusting the refractive index of each sub-layer of the dielectric film, the refractive index of the transparent substrate, and the number of sub-layers forming the layer, it is possible to form a layer different from the conventional dielectric film. Thus, it can obtain excellent properties of the above-mentioned optical filter. For example, it is possible to secure excellent transmittance characteristics even if the characteristic of low ripple value is maintained as low with the dielectric film and even if a substrate, such as an infrared absorption glass, having relatively poor transmittance characteristics is used as a transparent substrate.

The dielectric film of the present invention is different from the conventional dielectric film as the IR reflective layer and the AR layer. Accordingly, the actual layer configuration is also different.

For example, the dielectric layer may be formed to satisfy the V value according to Equation 2 below is 17 or less.

$$V = K\times\{[(n_1/n_2)^{2p}\times(n_1^2/n_s)-1]/[(n_1/n_2)^{2p}\times(n_1^2/n_s)+1]\}^2 \quad \text{[Equation 2]}$$

In Equation 2, $n_1$ is the refractive index of the first sub-layer, $n_2$ is the refractive index of the second sub-layer, $n_s$ is the refractive index of the transparent substrate, K is the total number of layers of the first and second sub-layers in the dielectric film, and p is a number satisfying K=(2p+1).

V in Equation 2 is written based on an equation for confirming the theoretical reflectivity for effectively blocking the light to be blocked by the IR reflective layer when designing the IR reflective layer and the AR layer. As confirmed through the equation, when the first and second sub-layers are the same, as the values of K and p increase, the value of V increases. Therefore, when designing the conventional IR reflective layer or the AR layer, the number of layers (K) of the first and second sub-layers is at least 20 or more to secure the intended performance, and in this case, the V value is at least 20 or more.

However, designing of such conventional layers stated above does not contribute to securing optical properties such as a desired low ripple value for the present invention. In other words, to achieve the object of the present invention, it is necessary to adjust the refractive index and the number of layers of each layer so that the V value of Equation 2 is 17 or less. Although the reason is unclear, a dielectric film that satisfies the above design seems to induce light interference that increases the overall transmittance of the optical filter with the combination of the optical characteristics (e.g., refractive index) of the transparent substrate, and that can secure a low ripple value. In another example, the V value of Equation 2 can be 16 or less, 15 or less, 14 or less, 13 or less, 12 or less, 11 or less, 10 or less, 9 or less, 8 or less, 7 or less, or 6 or less, or 1 or more, 2 or more, 3 or more, 4 or more, 5 or more, or 6 or more.

In Equation 2, the ratio ($n_1/n_2$) of the refractive index ($n_1$) of the first sub-layer and the refractive index ($n_2$) of the second sub-layer may be in the range of about 1.4 to 2.0 in one example. In another example, the ratio may be about 1.45 or more, 1.5 or more, 1.55 or more, 1.6 or more, 1.65 or more, 1.7 or more, or 1.75 or more, or 1.95 or less, 1.9 or less, 1.85 or less, or 1.8 or less.

In Equation 2, the refractive index $n_1$ of the first sub-layer may be in a range of about 1.8 to 3.5. In another example, the refractive index $n_1$ may be 2.0 or more, 2.2 or more, 2.4 or more, 2.5 or more, or 2.55 or more, or about 3.3 or less, 3.1 or less, 2.9 or less, or 2.7 or less.

In Equation 2, the refractive index $n_2$ of the second sub-layer may be in the range of about 1.1 to 1.7. In another example, the refractive index $n_2$ may be 1.2 or more, 1.3 or more, or 1.4 or more, or 1.65 or less, 1.6 or less, 1.55 or less, or about 1.5 or less.

Among the sub-layers of the dielectric film, the first sub-layer can be defined as a layer having a refractive index in the above range. The second sub-layer can be defined as a layer having a refractive index in the above range, or a layer having a refractive index satisfying the refractive index of the first sub-layer and the refractive index ratio in the above range.

Equation 2 can be used to calculate a value for a structure including first and second sub-layers alternately repeatedly stacked. If the refractive indices of the first sub-layers having two or more layers are different from each other or the refractive indices of the second sub-layers having two or more layers are different from each other, the arithmetic average value of the refractive indices of the first sub-layers is used as $n_1$ in Equation 2, and the arithmetic average value of the refractive indices of the second sub-layers is used as $n_2$ in Equation 2 when Equation 2 is used for the calculation.

In Equation 2, the ratio ($n_1/n_s$) of the refractive index ($n_1$) of the first sub-layer and the refractive index ($n_s$) of the transparent substrate may be in the range of about 1.4 to 2.0 in one example. In another example, the ratio may be 1.45 or more, 1.5 or more, 1.55 or more, 1.6 or more, or 1.65 or more, or 1.95 or less, 1.9 or less, 1.85 or less, 1.8 or less, 1.75 or less, or 1.7 or less. An appropriate material may be selected to satisfy the above range for the consideration of the refractive index of the transparent substrate.

In Equation 2, K that determines p, that is, the total number of layers of the first sub-layer and the second sub-layer (the number of layers in the first sub-layer+the number of layers in the second sub-layer) can be 17 or less, 16 or less, 15 or less, 14 or less, 13 or less, 12 or less, 11 or less, 10 or less, 9 or less, 8 or less, 7 or less, or 6 or less. In another example, K can be 2 or more, 3 or more, 4 or more, 5 or more, or 6 or more. The dielectric film may include a repeated stacked structure of the first and second sub-layers, and thus, in this case, the number of layers of each of the first and second sub-layers is the same as each other, or one layer may have one or two more layers than the other layer The thickness of the first and second sub-layers in the dielectric film may be adjusted according to the purpose, but it may be in the range of approximately 5 nm to 200 nm. In another example, the thickness may be 10 nm or more, 15 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, or 85 nm or more. 190 nm or less, 180 nm or less, 170 nm or less, 160 nm or less, 150 nm or less, 140 nm or less, 130 nm or less, 120 nm or less, 110 nm or less, 100 nm or less, 90 nm or less, 80 nm or less, 70 nm or less, 60 nm or less, 50 nm or less, 40 nm or less, 30 nm or less, 20 nm or less, or 15 nm or less.

An average value (arithmetic average) of the thickness of the first sub-layers and the thickness of the second sub-layers included in the dielectric film may be in the range of about 5 nm to about 70 nm. In another example, the average value may be 10 nm or more, 15 nm or more, 20 nm or more, 25 nm or more, 30 nm or more, or 35 nm or more, or 65 nm or less, 60 nm or less, 55 nm or less, 50 nm or less, 45 nm or less, or 40 nm or less.

The dielectric film may include other sub-layers in addition to the first and second sub-layers, but even in such a case, the thickness of the entire sub-layer should be controlled to be 15 layers or less, 14 layers or less, 13 layers or less, 12 layers or less, 11 layers or less, 10 layers or less, 9 layers or less, 8 layers or less, 7 layers or less, or 6 layers or less. It is also necessary to be controlled to be 2 layers or more, 3 layers or more, 4 layers or more, 5 layers or more, or 6 layers or more.

When the dielectric film includes the sub-layers other than the first and second sub-layers, the ratio of the total number of layers of the first and second sub-layers to the total number of the sub-layers shall be 80% or more, 85% or more, 90% or more, or 95% or more. The upper limit of the ratio is 100%.

Such a dielectric film may have an overall thickness in the range of about 100 nm to 500 nm. In another example, the thickness may be in the range of about 120 nm or more, 140 nm or more, 160 nm or more, 180 nm or more, or 200 nm or more, or 480 nm or less, 460 nm or less, 440 nm or less, 420 nm or less, 400 nm or less, 380 nm or less, 360 nm or less, 340 nm or less, 320 nm or less, 300 nm or less, 280 nm or less, 260 nm or less, 240 nm or less, or 220 nm or less.

The first sub-layer may be formed on one surface of the dielectric film alternately including the first and second sub-layers satisfying Equation 2, and the second sub-layer may be formed on the other surface. For example, the first sub-layer may be formed on the surface of the dielectric film on the transparent substrate side, and the second sub-layer may be formed on the opposite surface of the dielectric film. However, the stacking order may be changed.

Through the application of the dielectric film having the above characteristics, it is possible to secure the optical characteristics having the desired low ripple value. Such a dielectric film may be formed on only one surface of the transparent substrate, but it may be formed on both surfaces of the transparent substrate as appropriate. In addition, the optical filter may not include a dielectric film other than the dielectric film having a V value of 17 or less in Equation 2 above. In other words, when dielectric films are formed on both surfaces of a transparent substrate, it is appropriate that the V values of the dielectric films are 17 or less, respectively.

For material forming the dielectric film, that is, the kind of material for forming each of the sub-layers is not particularly limited, and a publicly known material may be utilized. Usually, for the preparation of the low refractive sub-layer, a fluoride such as $SiO_2$ or $Na_5Al_3F_{14}$, $Na_3AlF_6$ or $MgF_2$ is utilized, and for the preparation of the high refractive sub-layer, $TiO_2$, $Ta_2O_5$, $Nb_2O_5$, ZnS, or ZnSe may be utilized, but the material utilized in the present invention is not limited thereto. The method for forming the dielectric film as described above is not particularly limited, and, for example, may be formed by applying a publicly known deposition method.

The optical filter of the present invention may exhibit excellent optical properties with excellent durability. For example, the optical filter may exhibit a transmission band having a T50% cut-on wavelength in a range of about 390 nm to 430 nm. The T50% cut-on wavelength is the shortest wavelength among wavelengths showing a transmittance of 50% within a wavelength range of 300 nm to 700 nm. One or two or more wavelengths showing the transmittance of 50% may exist within the range of 390 nm to 430 nm. If one wavelength exists, that is the one that becomes the T50% cut-on wavelength. If two or more wavelengths exist, the shortest one among them becomes the T50% cut-on wavelength. The T50% cut-on wavelength can be further adjusted in the range of 392 nm or more, 394 nm or more, 396 nm or more, 398 nm or more, 400 nm or more, 402 nm or more, 404 nm or more, 406 nm or more, 408 nm or more, or 410 nm or more and/or 428 nm or less, 426 nm or less, 424 nm or less, 422 nm or less, 420 nm or less, 418 nm or less, 416 nm or less, 414 nm or less, 412 nm or less, or 410 nm or less.

The optical filter may exhibit a transmission band having a T50% cut-off wavelength in the range of about 590 nm to 680 nm. The T50% cut-off wavelength is the longest wavelength among wavelengths showing a transmittance of 50% within a wavelength range of 500 nm to 800 nm. One or two or more wavelengths showing the transmittance of 50% may exist within the range of 500 nm to 800 nm. If one wavelength exists, that is the one that becomes the T50% cut-off wavelength. If two or more wavelengths exist, the longest one among them becomes the T50% cut-of wavelength. The T50% cut-off wavelength can be further adjusted in the range of 592 nm or more, 594 nm or more, 596 nm or more, 598 nm or more, 600 nm or more, 602 nm or more, 604 nm or more, 606 nm or more, 608 nm or more, 610 nm or more, 612 nm or more, 614 nm or more, 616 nm or more, 618 nm or more, 620 nm or more, 622 nm or more, 624 nm or more, or 626 nm or more and/or 678 nm or less, 676 nm or less, 674 nm or less, 672 nm or less, 670 nm or less, 668 nm or less, 666 nm or less, 664 nm 662 nm or less, 660 nm or less, 658 nm or less, 656 nm or less, 654 nm or less, 652 nm or less, 650 nm or less, 648 nm or less, 646 nm or less, 644 nm or less, 642 nm or less, 640 nm or less, 638 nm or less, 636 or less, 634 nm or less, 632 nm or less, or 630 nm or less.

The optical filter may have a transmission band exhibiting an average transmittance of 75% or more within a range of 425 nm to 560 nm. In another example, the average transmittance may be adjusted within the range of 77% or more, 79% or more, 81% or more, 83% or more, 85% or more, 87% or more, 89% or more, 91% or more, 92% or more, or 92.5% or more, and/or 98% or less, 96% or less, 94% or less, 93% or less, or 92.5% or less.

The optical filter of the present invention may have a transmission band exhibiting a maximum transmittance of 79% or more within a range of 425 nm to 560 nm. In another example, the maximum transmittance may be adjusted within the range of 81% or more, 83% or more, 85% or more, 87% or more, 89% or more, 91% or more, 93% or more, or 95% or more and/or 100% or less, 98% or less, 96% or less.

The optical filter of the present invention may have a transmission band exhibiting an average transmittance of 2% or less within a range of 350 nm to 390 nm. In another example, the average transmittance may be further adjusted within the range of 0% or more, 0.1% or more, or 0.2% or more and/or 1.8% or less, 1.6% or less, 1.4% or less, 1.2% or less, 1.0% or less, 0.8% or less, 0.6% or less, 0.4% or less, 0.35% or less, or 0.3% or less.

The optical filter of the present invention may have a transmission band exhibiting a maximum transmittance of 10% or less within a range of 300 nm to 390 nm. In another example, the maximum transmittance may be further adjusted within the range of 0% or more, 0.5% or more, 1% or more, 1.5% or more, 2% or more, or 2.5% or more and/or 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, or 3% or less.

The optical filter of the present invention may have a transmittance of 2% or less at a wavelength of 700 nm. In another example, the transmittance may be further adjusted within the range of 0% or more, 0.2% or more, 0.4% or more, 0.6% or more, or 0.8% or more and/or 1.8% or less, 1.6% or less, 1.4% or less, 1.2% or less, or 1.0% or less.

The optical filter of the present invention may have a transmission band exhibiting an average transmittance of 2% or less within a range of 700 nm to 800 nm. In another example, the average transmittance may be further adjusted within the range of 0% or more, 0.1% or more, 0.3% or more, 0.4% or more, or 0.5% or more and/or 1.8% or less, 1.6% or less, 1.4% or less, 1.2% or less, 1.0% or less, 0.8% or less, 0.6% or less, or 0.5% or less.

The optical filter of the present invention may have a transmission band exhibiting a maximum transmittance of 2% or less within a range of 700 nm to 800 nm. In another example, the maximum transmittance may be further adjusted within the range of 0% or more, 0.2% or more, 0.4% or more, 0.6% or more, or 0.8% or more and/or 1.8% or less, 1.6% or less, 1.4% or less, 1.2% or less, or 1.0% or less.

The optical filter of the present invention may have a transmission band exhibiting an average transmittance of 2% or less within a range of 800 nm to 1000 nm. In another example, the average transmittance may be further adjusted within the range of 0% or more, 0.01% or more, 0.03% or more, 0.05% or more, 0.07% or more, or 0.09% or more and/or 1.8% or less, 1.6% or less, 1.4% or less, 1.2% or less, 1.0% or less, 0.8% or less, 0.6% or less, 0.4% or less, 0.2% or less, 0.15% or less, or 0.1% or less.

The optical filter of the present invention may have a transmission band exhibiting a maximum transmittance of 2% or less within a range of 800 nm to 1000 nm. In another example, the maximum transmittance may be further adjusted within the range of 0% or more, 0.2% or more, 0.4% or more, 0.6% or more, or 0.8% or more and/or 1.8% or less, 1.6% or less, 1.4% or less, 1.2% or less, 1.0% or less, 0.8% or less, 0.6% or less, or 0.4% or less.

The optical filter of the present invention may have a transmission band exhibiting an average transmittance of 5% or less within a range of 1000 nm to 1050 nm. In another example, the average transmittance may be further adjusted within the range of 0% or more, 0.5% or more, 1% or more, or 1.5% or more and/or 4.5% or less, 4% or less, 3.5% or less, 3% or less, 2.5% or less, 2% or less, 1.5% or less, 1% or less, 0.8% or less, 0.6% or less, 0.4% or less, or 0.3% or less.

The optical filter of the present invention may have a transmission band exhibiting a maximum transmittance of 5% or less within a range of 1000 nm to 1050 nm. In another example, the maximum transmittance may be further adjusted within the range of 0% or more, 0.5% or more, 1% or more, or 1.5% or more and/or 4.5% or less, 4% or less, 3.5% or less, 3% or less, 2.5% or less, 2% or less, 1.5% or less, 1% or less, 0.8% or less, 0.6% or less, 0.4% or less, or 0.3% or less.

The optical filter of the present invention may have a transmittance of 10% or less at a wavelength of 1050 nm. In another example, the transmittance may be further adjusted within the range of 0% or more, 0.5% or more, 1% or more, or 1.5% or more and/or 9% or less, 8% or less, 7% or less, 6% or less, 5% or less, 4% or less, 3% or less, 2% or less, 1.5% or less, 1% or less, 0.5% or less, or 0.1% or less.

The optical filter of the present invention may exhibit any one or a combination of two or more of the above-described optical characteristics, and may suitably satisfy all of the above-described optical characteristics. In addition to the above-described layers, the optical filter may be added with various necessary layers within a range that does not impair the desired effect.

The optical filter may have the ripple value within the above-described range, and the low ripple value may be maintained even when the incident angle is changed. In other words, the ripple value at the incident angle of 0° and the ripple value at the incident angle of 40° for the optical filter may be within the above-described ranges.

The present invention also relates to an imaging capturing device including the optical filter. In this case, the configuration of the imaging capturing device or the application of the optical filter is not particularly limited, and publicly known configurations and applications may be adapted. In addition, the use of the optical filter of the present invention is not limited to the imaging capturing device, and may be applied to various other applications requiring near-infrared cut-off (e.g., a display device such as a PDP, etc.).

Below, the present invention will be described in detail through Examples, but the scope of the present invention is not limited by the Examples below.

Evaluation of Transmittance Spectrum

The transmittance spectrum was measured by a spectrophotometer (Perkinelmer, Product Name: Lambda750) for a specimen obtained by cutting the measurement object to a predetermined size (width and length, respectively, 10 mm and 10 mm). The transmittance spectrum was measured for each wavelength and incident angle according to the manual of the equipment. The specimen was placed on a straight line between the measuring beam of the spectrophotometer and the detector, and the transmittance spectrum was measured while changing the angle of incidence of the measuring beam from 0° to 40°. Unless otherwise specified, the transmittance spectrum results in this embodiment are the results when the incident angle is 0°, and in this case, the incident angle is a direction substantially parallel to the surface normal direction of the specimen.

The average transmittance within a predetermined wavelength region in the transmittance spectrum is the result of obtaining the arithmetic average of the measured transmittances after measuring the transmittance of each wavelength while increasing the wavelength by 1 nm from the shortest wavelength in the wavelength region, and the maximum transmittance is the maximum transmittance among transmittances measured while increasing the wavelength by 1 nm. For example, the average transmittance within the wavelength range of 350 nm to 360 nm is the arithmetic average of the transmittance measured at a wavelength at 350 nm, 351 nm, 352 nm, 353 nm, 354 nm, 355 nm, 356 nm, 357 nm, 358 nm, 359 nm and 360 nm, respectively, and the maximum transmittance within the wavelength range of 350 nm to 360 nm is the highest transmittance among transmittances measured at a wavelength of 350 nm, 351 nm, 352 nm, 353 nm, 354 nm, 355 nm, 356 nm, 357 nm, 358 nm, It 359 nm and 360 nm, respectively.

In the following tables summarizing the characteristics of the Examples and comparative examples of the present invention, $T_{MAX}$ is the maximum transmittance within a wavelength region and its unit is %, and $T_{AVG}$ is the average transmittance within a wavelength region and its unit is %. Also, in the above table, T50% cut-on is the shortest wavelength (unit: nm) with 50% transmittance within the wavelength region of 350 nm to 425 nm, and T50% cut-off is the longest wavelength (unit: nm) with 50% transmittance within the wavelength region of 560 nm to 700 nm.

Evaluation of Ripple Value

The ripple value was obtained by finding the difference ($=T_{diff.\ i}=T_i-T_{ave.\ i}$)(i=1~n) between the average transmittance ($T_{ave.\ i}$, i=1 to n) and the actual transmittance ($T_i$, i=1 to n) in the wavelength region (450 nm to 560 nm) first, and then subtracting the minimum value ($Min(T_{diff.\ i})$) from the maximum value ($Max(T_{diff.\ i})$) of the found difference. In the above, the subscript i, which is determined in the range from 1 to n, is an ordinal number indicating a wavelength. For example, when obtaining the ripple value in the range of 450 nm to 560 nm, 450 nm is designated as a case where i is 1, and then, when the wavelength increases by 1 nm, i also increases by 1. In other words, 451 nm is designated as i is 2, and 560 nm is designated as i is 111.

The ripple value is an R value determined according to Equation A below.

$$R = \mathrm{Max}(T_{diff.i}) - \mathrm{Min}(T_{diff.i}) \quad \text{[Formula A]}$$

In Formula A, R is the ripple value, $Max(T_{diff.\ i})$ is the maximum value among the difference between the average transmittance and the actual transmittance, and $Min(T_{diff.i})$ is the minimum value among the difference between the average transmittance and the actual transmittance.

The ripple value was calculated using a cubic spline regression equation.

Evaluation of Refractive Index

The refractive index of the infrared absorption glass and the dielectric sub-layer was measured by Wiz Optics. An ellipsometer (M-2000 Ellipsometer) was used to measure a wavelength of 520 nm.

Evaluation of Adhesion Strength

The adhesion strength of the moisture-resistant layer was evaluated by a peel test of the Cross Hatch Cutter method according to ASTM D3359 standard. The peeling test is a test for measuring whether the moisture-resistant layer with cuts is peeled off together with an adhesive tape and for measuring the ratio at the time of peeling after forming a rectangular grid pattern on the moisture-resistant layer of the basic layer for an optical filter with eleven straight line cuts at an interval of 1 mm in horizontal and vertical directions, respectively and then, attaching the adhesive tape to the moisture-resistant layer with the grid pattern cuts. As for the adhesive tape, 3M's 810 Scotch Magic Tape was used. The peeling of the adhesive tape was performed by peeling the adhesive tape from the moisture-resistant layer at a peeling angle of about 1800 within a time of about 60 seconds to 120 seconds.

The evaluation criteria for the adhesion strength are as follows when evaluated in the above manner:

[Adhesion Strength Evaluation Criteria]

5B: In a case where peeling does not occur from a total area of the grid pattern cuts formed in the peel test.

4B: In a case where the peeling area is less than 5% of the total area of the grid pattern cuts in the peeling test.

3B: In a case where the peeling area is 5% or more and less than 15% of the total area of the grid pattern cuts in the peeling test.

2B: In a case where the peeling area is 15% or more and less than 35% of the total area of the grid pattern cuts in the peeling test.

1B: In a case where the peeling area is 35% or more and less than 65% of the total area of the grid pattern cuts in the peeling test.

0B: In a case where the peeling area is 65% or more of the total area of the grid pattern cuts in the peeling test.

Preparation Example 1: Preparation of Moisture-resistant Layer Material (A)

A moisture-resistant layer material (A) was prepared by mixing 10 weight % polysilazane solution and acryl-based silane coupling agent. The polysilazane solution was prepared by mixing polysilazane solution and dibutyl ether (DBE) in a weight ratio of 1:9 (polysilazane solution:DBE). For the acrylic silane coupling agent, 3-{diethoxy(methyl)silyl}propyl methacrylate was used. The mixing was prepared as a weight ratio of the polysilazane solution and the silane coupling agent (polysilazane solution:silane coupling agent) being about 10:3.

Preparation Example 2: Preparation of Moisture-Resistant Layer Material (B)

A moisture-resistant layer material (B) was prepared in the same manner as in Preparation Example 1 except 3-isocyanatepropyl trimethoxy silane was used for silane coupling agent.

Preparation Example 3: Preparation of Moisture-Resistant Layer Material (C)

A moisture-resistant layer material (C) was prepared in the same manner as in Preparation Example 1 except 3-glycidoxy propyltrimethoxy silane was used for silane coupling agent.

Preparation Example 4: Preparation of Moisture-Resistant Layer Material (D)

The moisture-resistant layer material (D) was prepared by mixing PDMS (polydimethylsiloxane) (Dow, Sylgard 184 Silicone Elastomer Base), amino modified polysiloxane (Dow, OFX-8040 Fluid) and a curing agent (Dow, Sylgard 184 Silicone Elastomer Curing Agent). The material was prepared by further mixing the above curing agent into a mixture of the above PDMS (A) and amino modified polysiloxane (B) in a weight ratio (A:B) of 2:8. In this case, the curing agent was mixed so that the proportion of the curing agent was about 10 weight % based on the total combined weight of the PDMS, the amino-modified polysiloxane, and the curing agent.

Preparation Example 5: Preparation of Moisture-Resistant Layer Material (E)

The moisture-resistant layer material (E) was prepared by mixing PDMS (polydimethylsiloxane) (Dow, Sylgard 184 Silicone Elastomer Base), hydroxy-modified polysiloxane (Dow, PMX-0930 Silanol Fluid), and a curing agent (Dow, Sylgard 184 Silicone Elastomer Curing Agent). The material was prepared by further mixing the above curing agent in a mixture of the above PDMS (A) and hydroxy-modified polysiloxane (B) in a weight ratio (A:B) of 2:8. In this case, the curing agent was mixed so that the proportion of the curing agent was about 10 weight % based on the total combined weight of the PDMS, the hydroxy-modified polysiloxane, and the curing agent.

Preparation Example 6: Preparation of Absorbent Layer Material

An absorption layer material was prepared by using an absorbent (1) (triazine-based dye) exhibiting an absorption maximum within a range of about 340 nm to 390 nm; an infrared absorbent (2) (squarylium-based dye) having an absorption maximum wavelength in a range of about 700 nm to 720 nm and a maximum width at half maximum (FWHM) of about 50 nm to 60 nm; an infrared absorbent (3) (squarylium-based dye) having an absorption maximum wavelength in a range of about 730 nm to 750 nm and the full width at half maximum (FWHM) of about 60 nm to 70 nm; an infrared absorbent (4) (squarylium-based dye) having an absorption maximum wavelength in a range of about 760 nm to 780 nm and the full width at half maximum (FWHM) of about 90 nm to 100 nm. The material was prepared by mixing the absorbents (1) to (4) and a binder resin. Cycloolefin polymer (COP) was used as the binder resin. The material was prepared by mixing about 5 parts by weight of the absorbent (1), about 0.1 parts by weight of the absorbent (2), about 0.2 parts by weight of the absorbent (3), and about 0.4 parts by weight of the absorbent (4) with respect to 100 parts by weight of the binder resin with toluene.

Example 1

Figure 5:
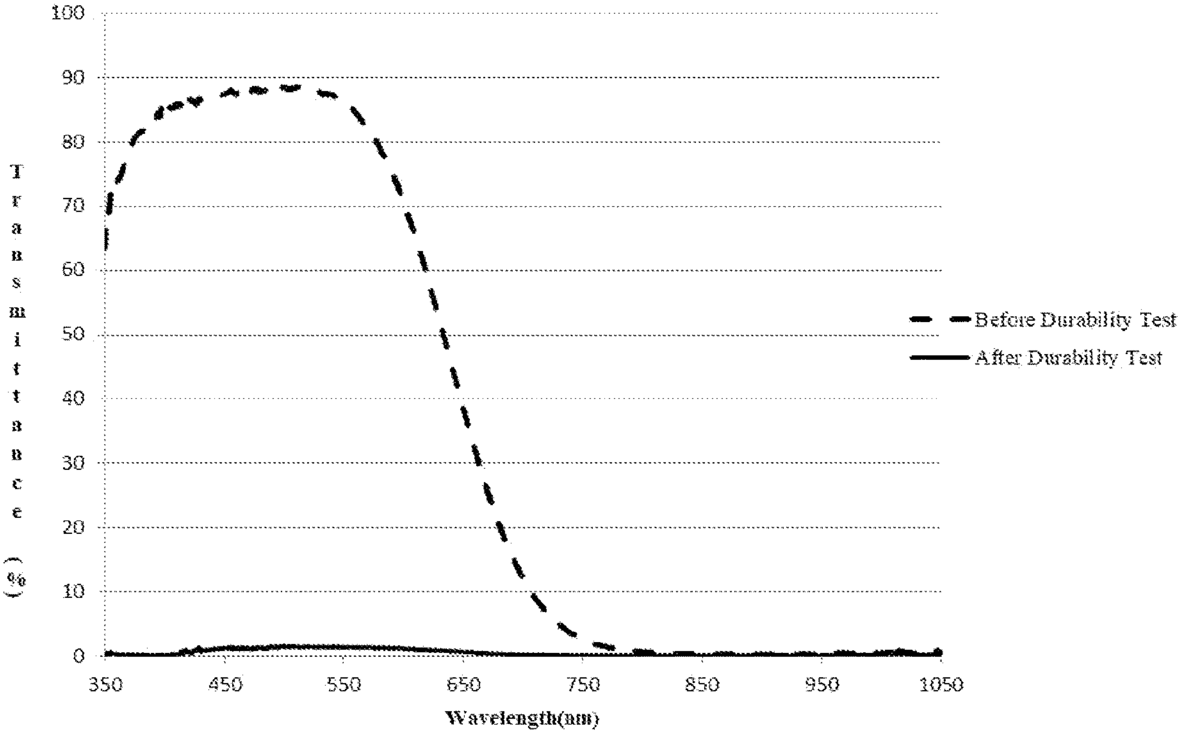
FIG. 5 is a spectral spectrum before and after durability test of transparent substrates utilized in Examples and Comparative Examples.
Figure 6:
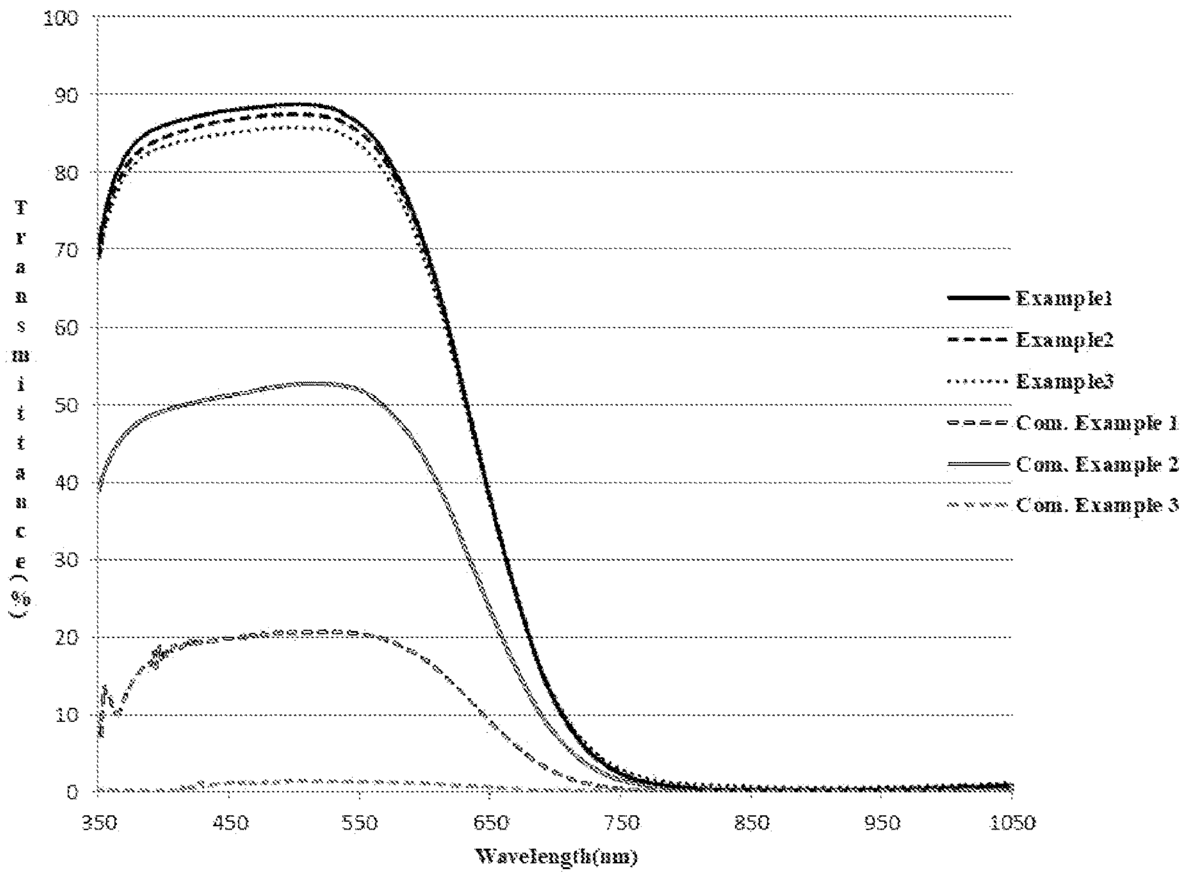
FIG. 6 is a spectral spectrum of the basic layer for an optical filter of Examples 1 to 3 and Comparative Examples 1 to 3.

For an infrared absorption glass, a phosphate-based absorption glass (manufactured by PTOT) having a transmittance spectrum as shown in FIG. 5 was used. The spectrum indicated by the dotted line in FIG. 5 is the spectrum before the durability test of the phosphate-based absorption glass, and the spectrum indicated by the solid line is the spectrum after the durability test. The durability test is a test where the glass is maintained at 85° C. and a relative humidity of 85% for 120 hours. The spectral characteristics (before the durability test) of the infrared absorption glass are summarized in Table 1 below. The infrared absorption glass had a refractive index of about 1.57.

TABLE 1

| | | Before Durability Test | After Durability Test |
|---|---|---|---|
| 350 nm~390 nm | $T_{MAX}$ | 83.34 | 0.57 |
| | $T_{AVG}$ | 77.30 | 0.22 |
| T50% cut-on | Wavelength (nm) | — | — |
| 425 nm~560 nm | $T_{MAX}$ | 88.63 | 1.57 |
| | $T_{AVG}$ | 87.53 | 1.29 |
| T50% cut-off | Wavelength (nm) | 633 | — |
| 700 nm | Transmittance (%) | 11.97 | 0.24 |
| 700 nm~800 nm | $T_{MAX}$ | 11.97 | 0.24 |
| | $T_{AVG}$ | 3.82 | 0.07 |
| 800 nm~1,000 nm | $T_{MAX}$ | 0.72 | 0.18 |
| | $T_{AVG}$ | 0.38 | 0.06 |
| 1,000 nm~1,050 nm | $T_{MAX}$ | 0.81 | 0.74 |
| | $T_{AVG}$ | 0.53 | 0.25 |
| 1,050 nm | Transmittance (%) | 0.54 | 0.65 |

To form a moisture-resistant layer having a thickness of about 0.1 μm, the moisture-resistant layer material (A) of Preparation Example 1 was deposited to one surface of the infrared absorption glass (before the durability test) and heat-treated at 130° C. for about 15 minutes. Then, a moisture-resistant layer having a thickness of about 0.1 m was formed on the other side of the infrared absorption glass (before the durability test) by depositing the moisture-resistant material (A) in the same manner to prepare a basic layer for an optical filter.

Example 2

A basic layer for an optical filter was prepared as same as Example 1 except the moisture-resistant layer material (B) of Preparation Example 2 was used for a moisture-resistant layer instead of the moisture-resistant layer material (A) of Preparation Example 1.

Example 3

A basic layer for an optical filter was prepared as same as Example 1 except the moisture-resistant layer material (C) of Preparation Example 3 was used for a moisture-resistant layer instead of the moisture-resistant layer material (A) of Preparation Example 1.

Comparative Example 1

Acrylic-based silane coupling agent (3-{diethoxy(methyl) silyl}propyl methacrylate) dispersed in toluene was used as a moisture-resistant layer material. The moisture-resistant layer material was deposited to one surface of the same infrared absorption glass (before the durability test) as in Example 1, and heat-treated at 130° C. for about 15 minutes to form a moisture-resistant layer having a thickness of about 0.1 μm. Then, a moisture-resistant layer having a thickness of about 0.1 μm was formed on the other side of the infrared absorption glass (before the durability test) to prepare a basic layer for an optical filter.

Comparative Example 2

For moisture-resistant layer material, only the polysilazane solution used for the preparation of the moisture-resistant layer material (A) of Preparation Example 1 was utilized. The moisture-resistant layer material was deposited to one surface of the same infrared absorption glass (before the durability test) as in Example 1 and heat-treated at 130° C. for about 15 minutes to form a moisture-resistant layer having a thickness of about 0.1 μm. Then, a moisture-resistant layer having a thickness of about 0.1 μm was formed on the other side of the infrared absorption glass (before the durability test) to prepare a basic layer for an optical filter.

Comparative Example 3

An infrared absorption glass where the moisture-resistant layer was not formed was used as a basic layer for an optical filter of Comparative Example 3.

The durability test was performed for Examples and Comparative Examples. The durability test is a test where each of the basic layer for an optical filter is maintained at 85° C. and a relative humidity of 85% for 120 hours.

TABLE 2

| | | Example | | | Comparative Example | | |
|---|---|---|---|---|---|---|---|
| | | 1 | 2 | 3 | 1 | 2 | 3 |
| 350 nm~ | $T_{MAX}$ | 85.3 | 83.7 | 82.7 | 16.7 | 48.6 | 0.57 |
| 390 nm | $T_{AVG}$ | 80.6 | 79.1 | 78.2 | 13.0 | 45.3 | 0.22 |
| T50% cut-on | Wavelength (nm) | — | — | — | — | — | — |
| 425 nm~ | $T_{MAX}$ | 88.7 | 87.5 | 85.8 | 20.8 | 52.7 | 1.57 |
| 560 nm | $T_{AVG}$ | 87.9 | 86.7 | 85.1 | 20.3 | 51.9 | 1.29 |
| T50% cut-off | Wavelength (nm) | 632 | 632 | 631 | — | — | — |
| 700 nm | Transmittance (%) | 11.5 | 11.7 | 11.9 | 2.6 | 7.4 | 0.24 |
| 700 nm~ | $T_{MAX}$ | 11.5 | 11.7 | 11.9 | 2.6 | 7.4 | 0.24 |
| 800 nm | $T_{AVG}$ | 3.6 | 3.7 | 4.2 | 0.7 | 2.4 | 0.07 |
| 800 nm~ | $T_{MAX}$ | 0.6 | 0.6 | 1.1 | 0.3 | 0.4 | 0.18 |
| 1,000 nm | $T_{AVG}$ | 0.3 | 0.3 | 0.7 | 0.1 | 0.2 | 0.06 |
| 1,000 nm~ | $T_{MAX}$ | 0.9 | 1.0 | 1.2 | 0.6 | 0.6 | 0.74 |
| 1,050 nm | $T_{AVG}$ | 0.7 | 0.7 | 1.0 | 0.3 | 0.5 | 0.25 |
| 1,050 nm | Transmittance (%) | 0.9 | 1.0 | 1.2 | 0.3 | 0.6 | 0.65 |

The adhesion evaluation results for the moisture-resistant layers in Examples 1 to 3 and Comparative Examples 1 to 3 are summarized in Table 3 below.

TABLE 3

| | Example | | | Comparative Example | | |
|---|---|---|---|---|---|---|
| | 1 | 2 | 3 | 1 | 2 | 3 |
| Adhesion Strength | 5B | 5B | 5B | 4B | 5B | — |

Example 4

A basic layer for an optical filter was prepared as same as Example 1 except the thickness of the moisture-resistant layers on both sides of the infrared absorption glass was adjusted to about 0.05 m. And then, the absorption layer material of Preparation Example 6 was deposited to any one of the moisture-resistant layers formed on both surfaces of the infrared absorption glass and heat-treated at 135° C. for 2 hours to prepare the basic layer for an optical filter having an absorption layer. At this time, the thickness of the absorption layer was formed to be about 3 km.

Example 5

A basic layer for an optical filter having an absorption layer formed was prepared as same as Example 4 except the thickness of the moisture-resistant layers was adjusted to about 0.1 km.

Example 6

A basic layer for an optical filter having an absorption layer formed was prepared as same as Example 4 except the thickness of the moisture-resistant layers was adjusted to about 5 km.

Example 7

A basic layer for an optical filter having an absorption layer formed was prepared as same as Example 4 except the thickness of the moisture-resistant layers was adjusted to about 10 μm.

Figure 7:
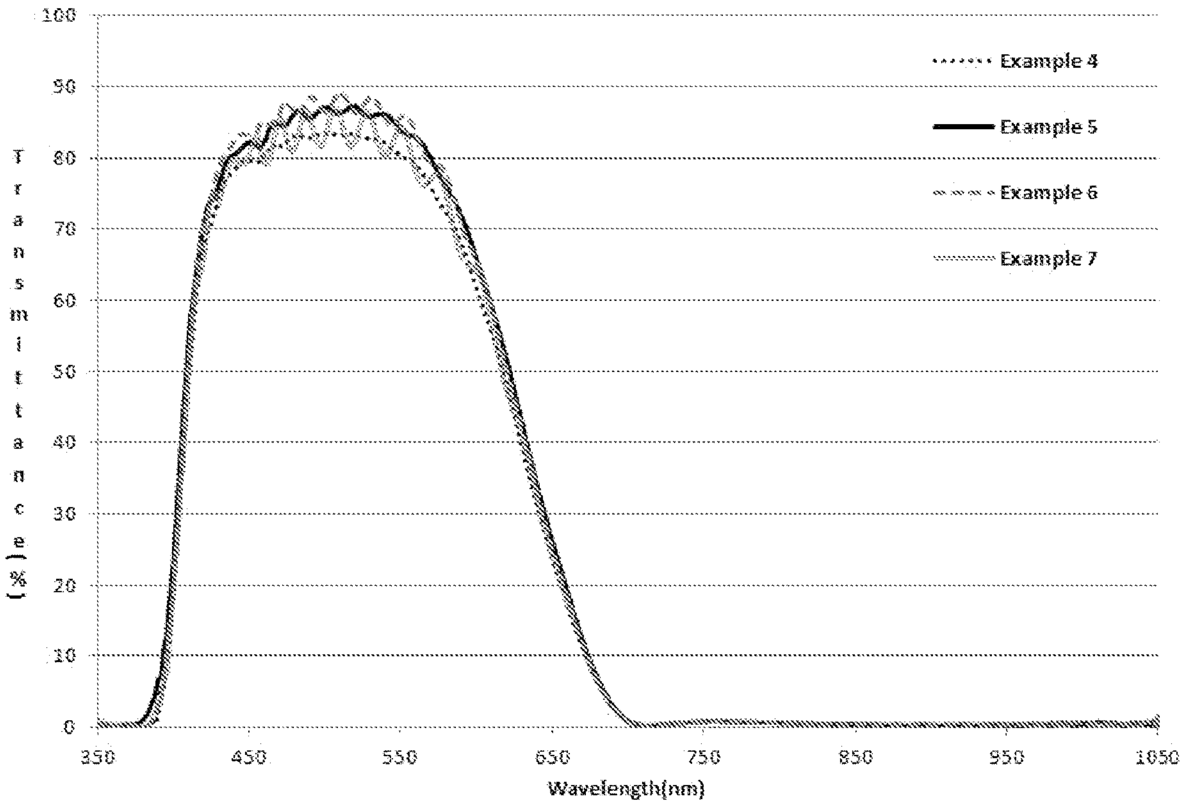
FIG. 7 is a spectral spectrum of the basic layer for an optical filter of Examples 4 to 7.

Tables 4 to 7 below are the results of summarizing transmittance spectra before and after the durability test of the basic layer for an optical filters of Examples 4 to 7, respectively. The durability test is a test where the basic layer for an optical filter is maintained at 85° C. and a relative humidity of 85% for 120 hours. FIG. 7 is a spectral spectrum of the basic layer for an optical filters of Examples 4 to 7 (before the durability test).

TABLE 4

| | | Example 4 | |
|---|---|---|---|
| | | Before Durability Test | After Durability Test |
| 350 nm~390 nm | $T_{MAX}$ | 2.2 | 1.57 |
| | $T_{AVG}$ | 0.38 | 0.37 |
| T50% cut-on | Wavelength (nm) | 410 | 412 |
| 425 nm~560 nm | $T_{MAX}$ | 88.1 | 83.42 |
| | $T_{AVG}$ | 85.5 | 81.02 |
| T50% cut-off | Wavelength (nm) | 621 | 617 |
| 700 nm | Transmittance (%) | 0.79 | 0.71 |
| 700 nm~800 nm | $T_{MAX}$ | 0.85 | 0.88 |

TABLE 4-continued

| | | Example 4 | |
|---|---|---|---|
| | | Before Durability Test | After Durability Test |
| | $T_{AVG}$ | 0.57 | 0.6 |
| 800 nm~1,000 nm | $T_{MAX}$ | 0.57 | 0.68 |
| | $T_{AVG}$ | 0.37 | 0.37 |
| 1,000 nm~1,050 nm | $T_{MAX}$ | 1.6 | 0.71 |
| | $T_{AVG}$ | 0.5 | 0.47 |
| 1,050 nm | Transmittance (%) | 1.6 | 0.45 |

TABLE 5

| | | Example 5 | |
|---|---|---|---|
| | | Before Durability Test | After Durability Test |
| 350 nm~390 nm | $T_{MAX}$ | 4 | 6.74 |
| | $T_{AVG}$ | 0.7 | 1.12 |
| T50% cut-on | Wavelength (nm) | 410 | 410 |
| 425 nm~560 nm | $T_{MAX}$ | 86.71 | 87.27 |
| | $T_{AVG}$ | 83.81 | 84.07 |
| T50% cut-off | Wavelength (nm) | 622 | 622 |
| 700 nm | Transmittance (%) | 0.95 | 0.95 |
| 700 nm~800 nm | $T_{MAX}$ | 0.95 | 0.95 |
| | $T_{AVG}$ | 0.64 | 0.64 |
| 800 nm~1,000 nm | $T_{MAX}$ | 0.74 | 0.64 |
| | $T_{AVG}$ | 0.4 | 0.40 |
| 1,000 nm~1,050 nm | $T_{MAX}$ | 0.96 | 0.92 |
| | $T_{AVG}$ | 0.54 | 0.51 |
| 1,050 nm | Transmittance (%) | 0.53 | 0.64 |

TABLE 6

| | | Example 6 | |
|---|---|---|---|
| | | Before Durability Test | After Durability Test |
| 350 nm~390 nm | $T_{MAX}$ | 3.23 | 3.22 |
| | $T_{AVG}$ | 0.46 | 0.42 |
| T50% cut-on | Wavelength (nm) | 410 | 411 |
| 425 nm~560 nm | $T_{MAX}$ | 90.84 | 89.20 |
| | $T_{AVG}$ | 87.05 | 85.35 |
| T50% cut-off | Wavelength (nm) | 622 | 620 |
| 700 nm | Transmittance (%) | 0.73 | 0.8 |
| 700 nm~800 nm | $T_{MAX}$ | 0.87 | 0.98 |
| | $T_{AVG}$ | 0.60 | 0.63 |
| 800 nm~1,000 nm | $T_{MAX}$ | 0.64 | 0.64 |
| | $T_{AVG}$ | 0.36 | 0.39 |
| 1,000 nm~1,050 nm | $T_{MAX}$ | 1.26 | 1.29 |
| | $T_{AVG}$ | 0.52 | 0.52 |
| 1,050 nm | Transmittance (%) | 1.26 | 1.29 |

TABLE 7

| | | Example 7 | |
|---|---|---|---|
| | | Before Durability Test | After Durability Test |
| 350 nm~390 nm | $T_{MAX}$ | 3.68 | 3.48 |
| | $T_{AVG}$ | 0.58 | 0.48 |
| T50% cut-on | Wavelength (nm) | 411 | 411 |
| 425 nm~560 nm | $T_{MAX}$ | 86.44 | 86.99 |
| | $T_{AVG}$ | 81.70 | 82.1 |
| T50% cut-off | Wavelength (nm) | 618 | 617 |

TABLE 7-continued

| | | Example 7 | |
|---|---|---|---|
| | | Before Durability Test | After Durability Test |
| 700 nm | Transmittance (%) | 0.76 | 0.83 |
| 700 nm~800 nm | $T_{MAX}$ | 0.86 | 0.90 |
| | $T_{AVG}$ | 0.59 | 0.62 |
| 800 nm~1,000 nm | $T_{MAX}$ | 0.59 | 0.66 |
| | $T_{AVG}$ | 0.39 | 0.37 |
| 1,000 nm~1,050 nm | $T_{MAX}$ | 0.94 | 1.62 |
| | $T_{AVG}$ | 0.34 | 0.45 |
| 1,050 nm | Transmittance (%) | 0.08 | 1.62 |

The adhesion force for the substrate of the moisture-resistant layer of the basic layer for an optical filter of Examples 4 to 7 was evaluated in the same manner as in the adhesion force evaluation of Table 3, and the results are summarized in Table 8 below.

TABLE 8

| | Example 4 | Example 5 | Example 6 | Example 7 |
|---|---|---|---|---|
| Adhesion Strength | 4B | 5B | 4B | 3B |

Figure 8:
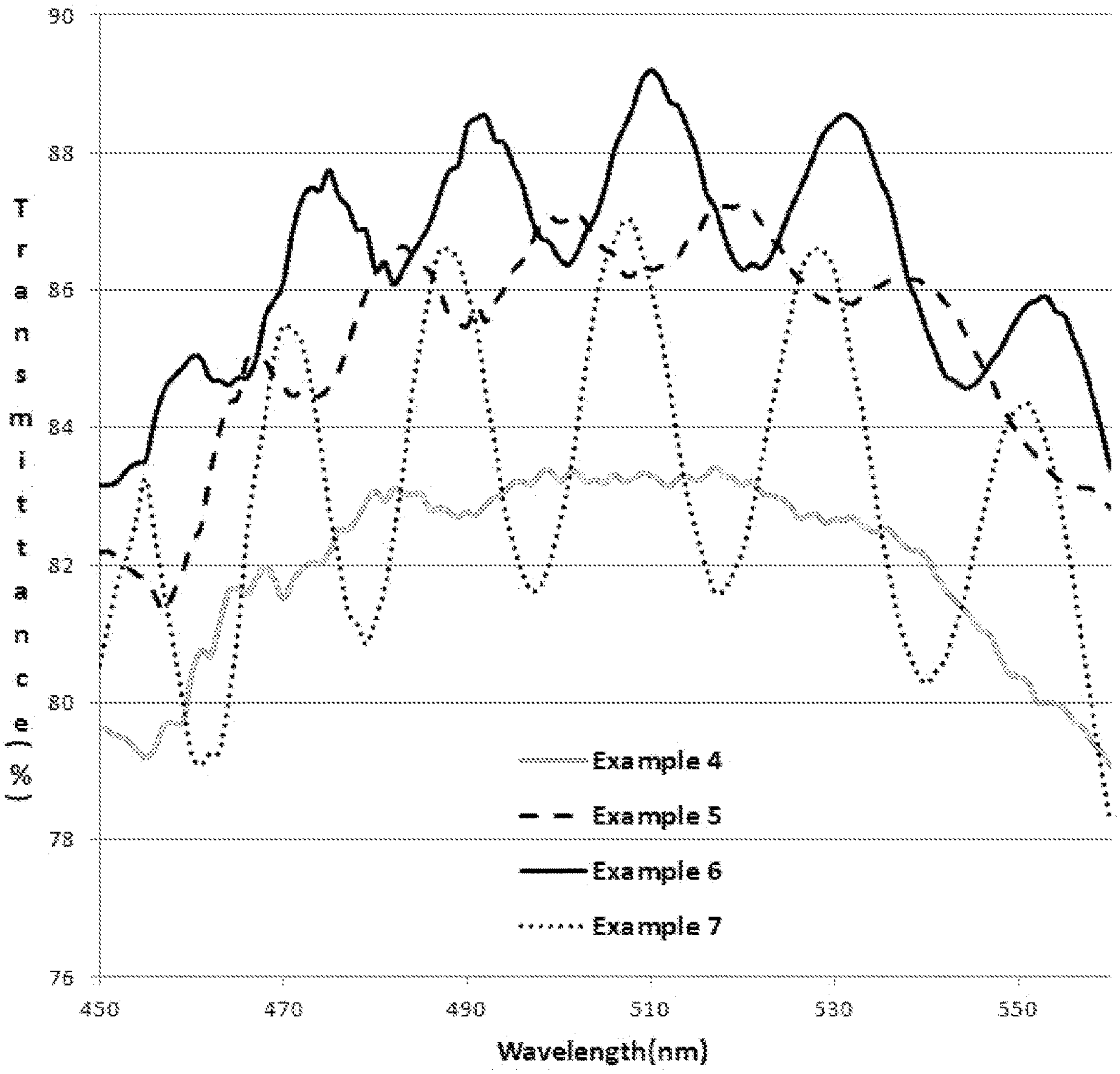
FIGS. 8 to 12 are spectral spectra for confirming the ripple values of the optical filter of Embodiments 4 to 7.
Figure 9:
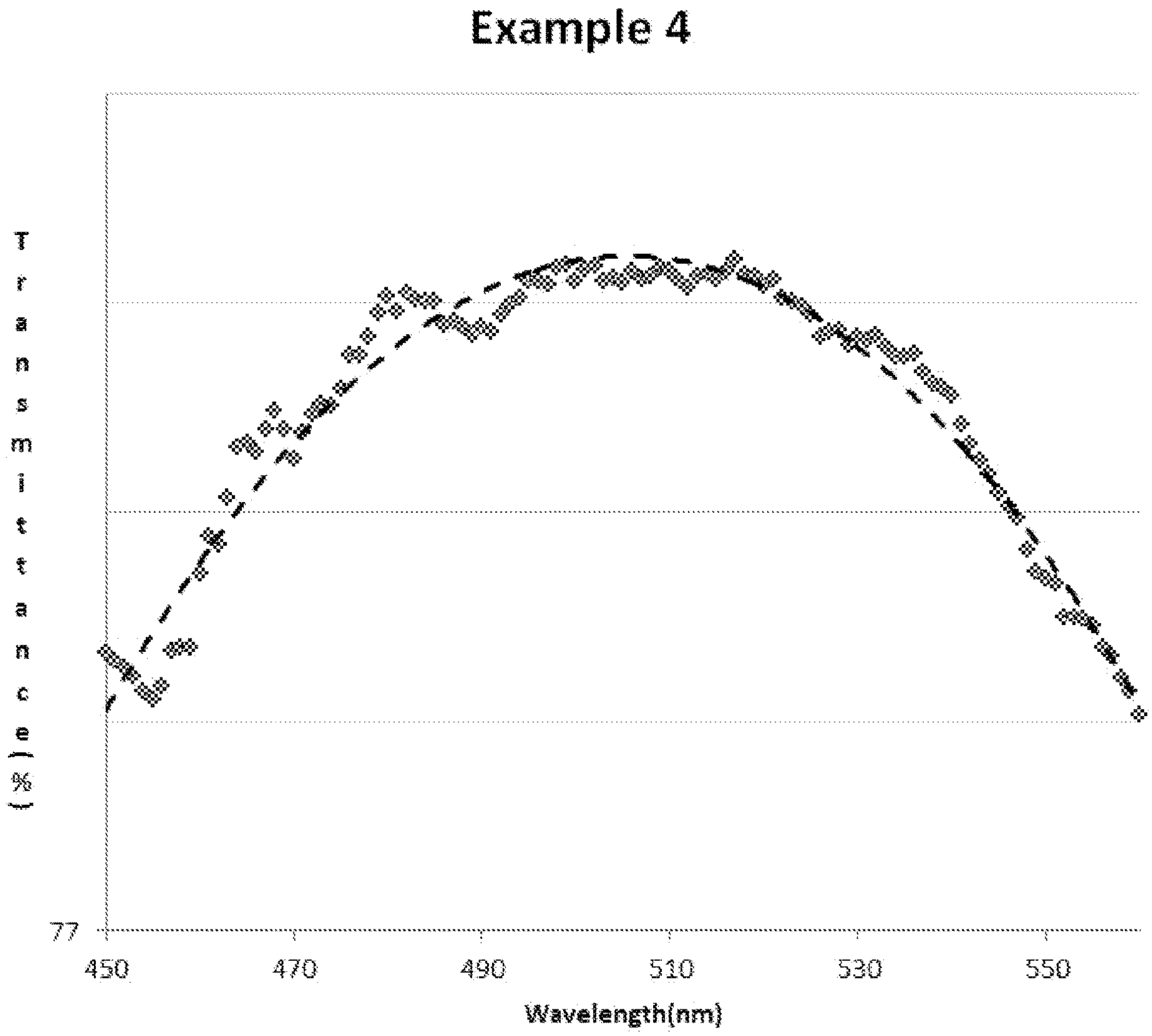
Figure 10:
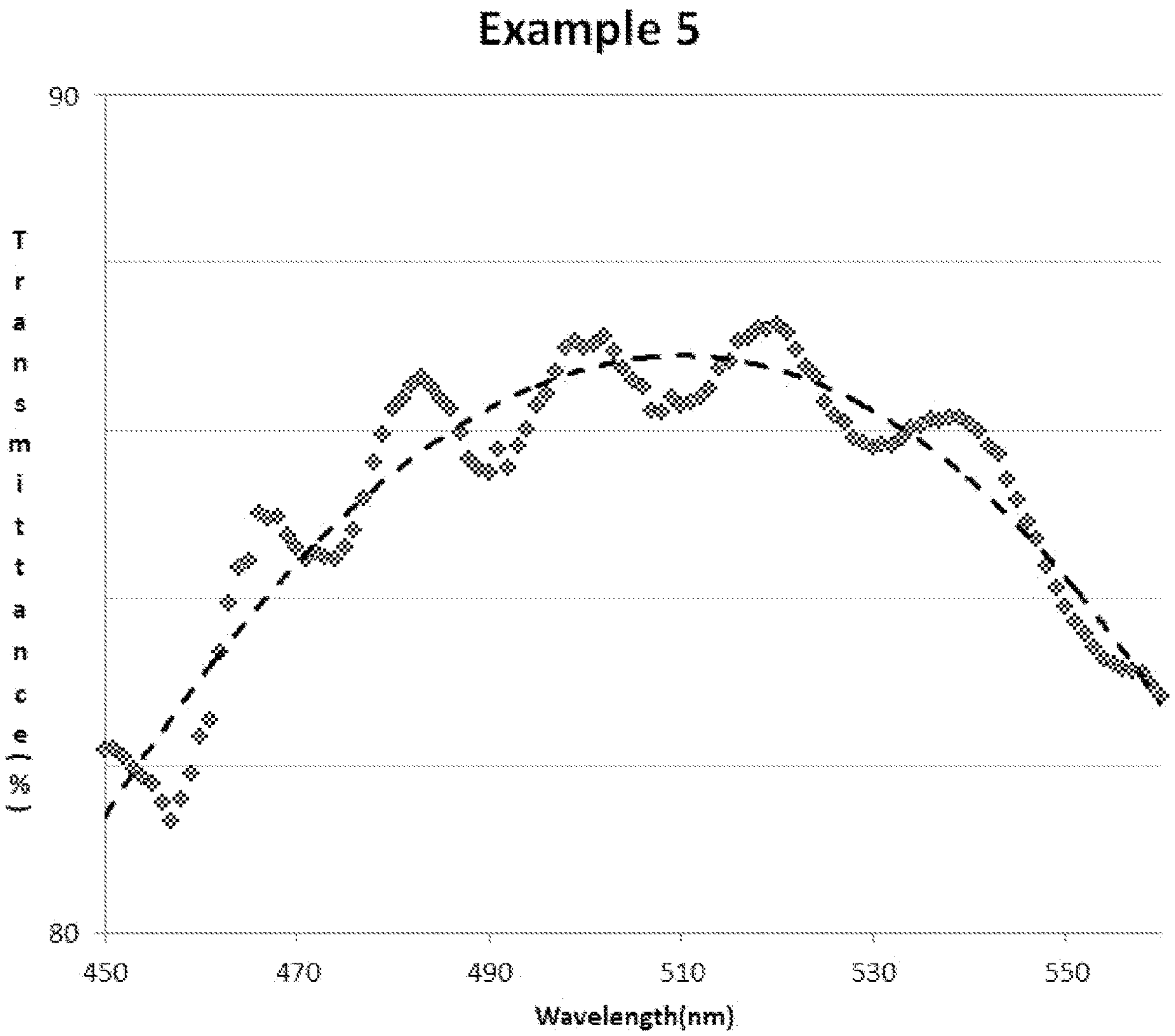
Figure 11:
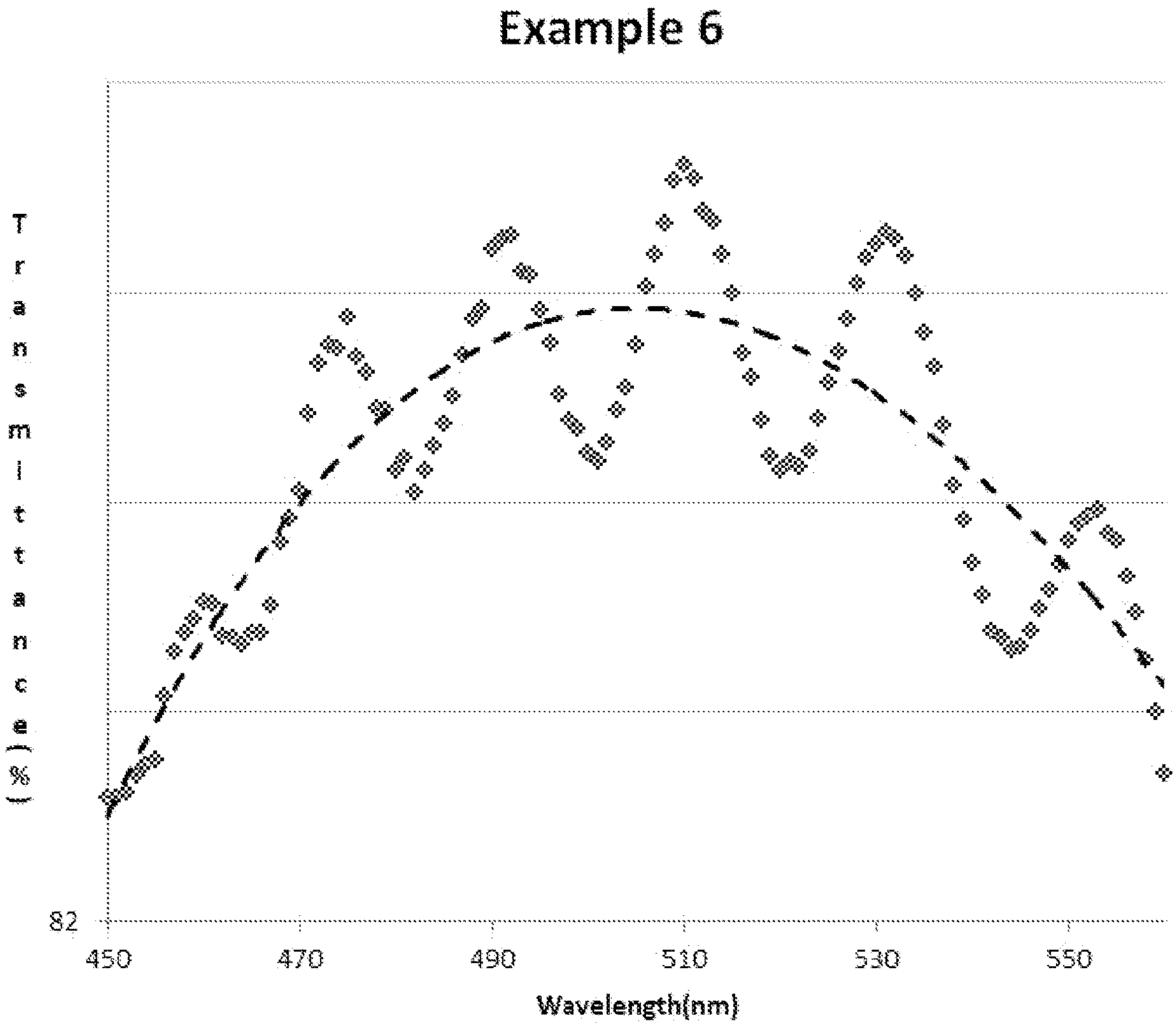
Figure 12:
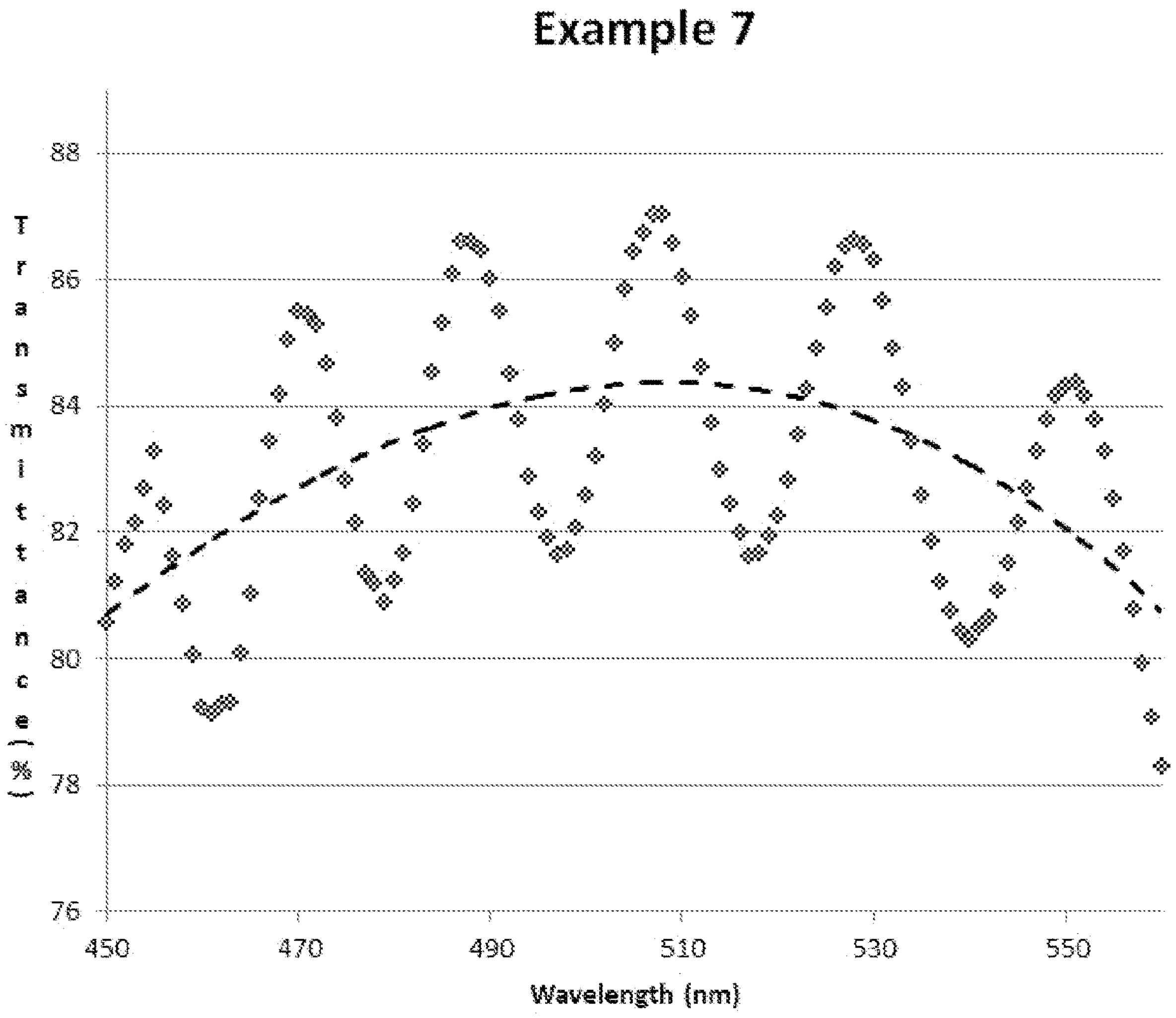

FIG. 8 is an enlarged view (Incident Angle: 0°) of the transmittance spectrum at a wavelength within the range of 450 nm to 560 nm to find the ripple value of the basic layer for an optical filter of Examples 4 to 7, and FIGS. 9 to 12 graphs are showing the process of obtaining the ripple value for each of Examples 4 to 7. Table 9 below summarizes the ripple values in the 450 nm to 560 nm wavelength region of the optical filters of Examples 4 to 7.

TABLE 9

| | Example 4 | Example 5 | Example 6 | Example 7 |
|---|---|---|---|---|
| Ripple Value (%) | 1.3 | 2.4 | 3.1 | 5.6 |

As can be seen from the FIGs. and the above tables, the ripple value increases from Example 4 to Example 7 and therefore, Example 4 shows the best results in terms of ripple value. However, Example 4 showed a slightly inferior result compared to Example 5 in terms of adhesion or coating properties of the moisture-resistant layer, and Examples 6 and 7 also showed that the adhesion of the moisture-resistant layer was inferior than that of Example 5. In addition, the visible light transmittance of Example 7 was also slightly inferior than that of the other Examples.

Example 8

The same basic optical filter was prepared as in Example 1, except that the moisture-resistant layer material (D) of Preparation Example 4 was used instead of the moisture-resistant layer material (A) of Preparation Example 1.

Example 9

The same basic optical filter was prepared as in Example 1, except that the moisture-resistant layer material (E) of Preparation Example 5 was used instead of the moisture-resistant layer material (A) of Preparation Example 1.

Comparative Example 4

For the moisture-resistant layer material, only the polydimethylsiloxane (PDMS) and curing agent used in the preparation of the moisture-resistant layer materials of Preparation Examples 4 and 5 were applied. The moisture-resistant layer material was deposited to one side of the same infrared absorption glass (before the durability test) as in Example 1, and was heat treated at 130° C. for about 15 minutes to form a moisture-resistant layer with a thickness of about 0.1 m. Then, a moisture-resistant layer having a thickness of about 0.1 m was formed on the other side of the infrared absorption glass (before the durability test) in the same manner, and the basic optical filter was prepared.

Figure 13:
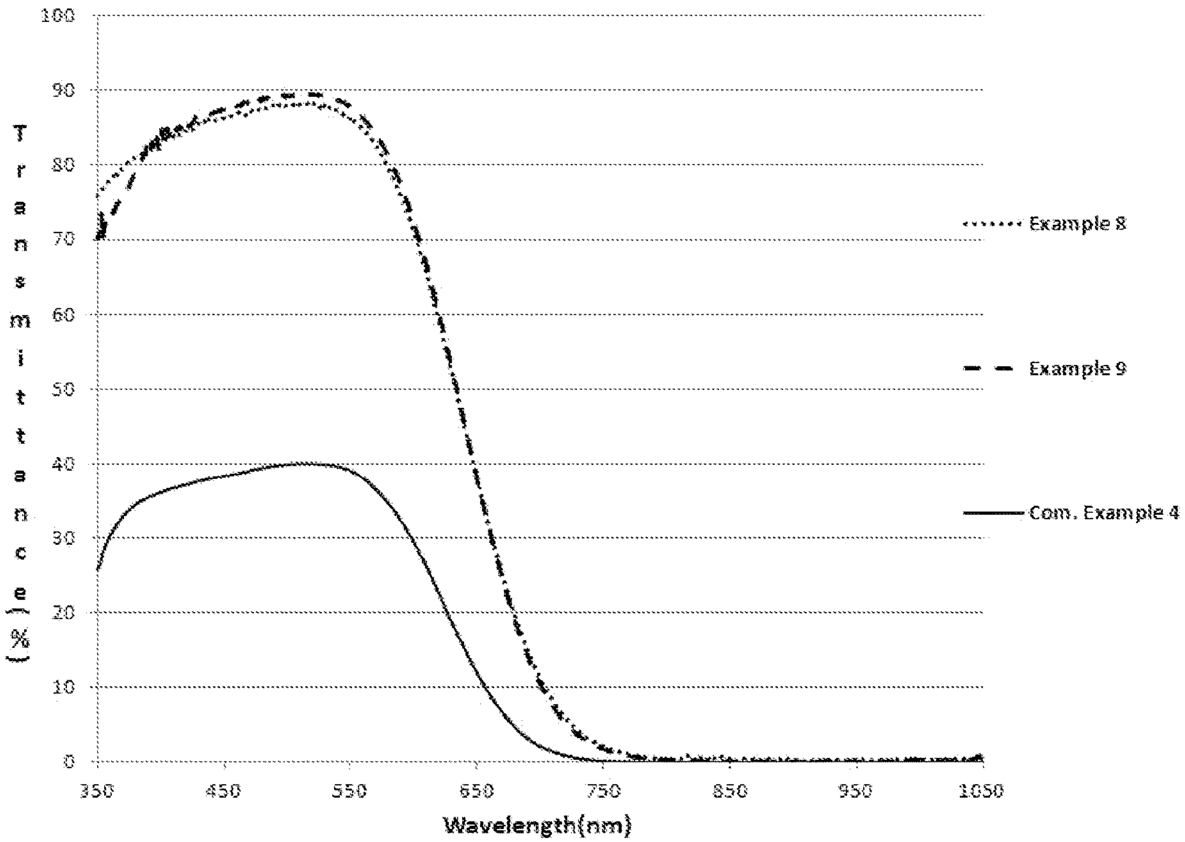
FIG. 13 is a spectral spectrum of the basic layer for an optical filter of Example 8, Example 9 and Comparative Example 4.

Durability tests were performed on the basic optical filter of Examples 8 and 9 and Comparative Example 4. The durability test is a test where each fabric is maintained at 85° C. and 85% relative humidity for 120 hours. Table 10 shows the transmittance characteristics after the above durability test performed on each fabric, and the results of Table 10 are also shown in FIG. 13.

TABLE 10

| | | Example 8 | Example 9 | Comparative Example 4 |
|---|---|---|---|---|
| 350 nm~390 nm | $T_{MAX}$ | 82.1 | 82.9 | 35.5 |
| | $T_{AVG}$ | 79.5 | 76.0 | 32.1 |
| T50% cut-on | Wavelength (nm) | — | — | — |
| 425 nm~560 nm | $T_{MAX}$ | 88.5 | 89.6 | 40.0 |
| | $T_{AVG}$ | 87.1 | 88.3 | 39.1 |
| T50% cut-off | Wavelength (nm) | 633 | 634 | — |
| 700 nm | Transmittance (%) | 11.1 | 10.3 | 2.1 |
| 700 nm~800 nm | $T_{MAX}$ | 11.1 | 10.3 | 2.1 |
| | $T_{AVG}$ | 3.3 | 2.9 | 0.5 |
| 800 nm~1,000 nm | $T_{MAX}$ | 0.9 | 0.5 | 0.0 |
| | $T_{AVG}$ | 0.4 | 0.2 | 0.0 |
| 1,000 nm~1,050 nm | $T_{MAX}$ | 0.6 | 0.9 | 0.1 |
| | $T_{AVG}$ | 0.5 | 0.3 | 0.0 |
| 1,050 nm | Transmittance (%) | 0.6 | 0.9 | 0.1 |

The results of the adhesion strength evaluation for the moisture-resistant layer of Examples 8 and 9 and Comparative Example 4 are summarized in Table 11 below.

TABLE 11

| | Example 8 | Example 9 | Comparative Example 4 |
|---|---|---|---|
| Adhesion Strength | 5B | 5B | 4B |

Example 10

The same basic optical filter was prepared as in Example 8, except that the thickness of the moisture-resistant layer on both sides of the infrared absorption glass was adjusted to about 0.05 μm. Then, the absorption layer material of Preparation Example 6 was deposited to either one of the moisture-resistant layers formed on both sides of the infrared absorption glass, and the basic optical filter formed with the absorption layer was prepared by heat treatment at 135° C. for 2 hours. At this time, the thickness of the absorption layer is about 3 μm.

Example 11

A same basic optical filter having an absorption layer was prepared as in Example 10, except that the thickness of the moisture-resistant layer was changed to about 0.1 μm.

Example 12

A same basic optical filter having an absorption layer was prepared as in Example 10, except that the thickness of the moisture-resistant layer was changed to about 5 μm.

Example 13

A same basic optical filter having an absorption layer was prepared as in Example 10, except that the thickness of the moisture-resistant layer was changed to about 10 μm.

Tables 12 to 15 below summarize the transmittance spectra before and after durability test of the basic optical filters of Examples 10 to 13, respectively. The durability test is a test where the basic optical filter is maintained at 85° C. and 85% relative humidity for 120 hours.

TABLE 12

| | | Example 10 | |
|---|---|---|---|
| | | Before Durability Test | After Durability Test |
| 350 nm~390 nm | $T_{MAX}$ | 1.2 | 2.9 |
| | $T_{AVG}$ | 0.3 | 0.4 |
| T50% cut-on | Wavelength (nm) | 411 | 410 |
| 425 nm~560 nm | $T_{MAX}$ | 89.0 | 87.8 |
| | $T_{AVG}$ | 86.0 | 84.8 |
| T50% cut-off | Wavelength (nm) | 622 | 622 |
| 700 nm | Transmittance (%) | 0.7 | 1.1 |
| 700 nm~800 nm | $T_{MAX}$ | 0.7 | 1.1 |
| | $T_{AVG}$ | 0.4 | 0.7 |
| 800 nm~1,000 nm | $T_{MAX}$ | 0.4 | 0.4 |
| | $T_{AVG}$ | 0.2 | 0.2 |
| 1,000 nm~1,050 nm | $T_{MAX}$ | 1.1 | 0.8 |
| | $T_{AVG}$ | 0.3 | 0.4 |
| 1,050 nm | Transmittance (%) | 0.5 | 0.5 |

TABLE 13

| | | Example 11 | |
|---|---|---|---|
| | | Before Durability Test | After Durability Test |
| 350 nm~390 nm | $T_{MAX}$ | 2.8 | 3.3 |
| | $T_{AVG}$ | 0.4 | 0.5 |
| T50% cut-on | Wavelength (nm) | 411 | 411 |
| 425 nm~560 nm | $T_{MAX}$ | 87.8 | 88.2 |
| | $T_{AVG}$ | 83.7 | 84.4 |
| T50% cut-off | Wavelength (nm) | 618 | 619 |
| 700 nm | Transmittance (%) | 0.7 | 0.8 |
| 700 nm~800 nm | $T_{MAX}$ | 0.8 | 0.8 |
| | $T_{AVG}$ | 0.5 | 0.6 |
| 800 nm~1,000 nm | $T_{MAX}$ | 0.7 | 0.5 |
| | $T_{AVG}$ | 0.4 | 0.3 |
| 1,000 nm~1,050 nm | $T_{MAX}$ | 0.9 | 0.7 |
| | $T_{AVG}$ | 0.6 | 0.5 |
| 1,050 nm | Transmittance (%) | 0.5 | 0.5 |

TABLE 14

| | | Example 12 | |
|---|---|---|---|
| | | Before Durability Test | After Durability Test |
| 350 nm~390 nm | $T_{MAX}$ | 2.9 | 4.1 |
| | $T_{AVG}$ | 0.3 | 0.9 |
| T50% cut-on | Wavelength (nm) | 411 | 412 |
| 425 nm~560 nm | $T_{MAX}$ | 88.7 | 88.5 |
| | $T_{AVG}$ | 84.5 | 84.2 |
| T50% cut-off | Wavelength (nm) | 618 | 619 |
| 700 nm | Transmittance (%) | 0.7 | 0.8 |
| 700 nm~800 nm | $T_{MAX}$ | 0.8 | 0.8 |
| | $T_{AVG}$ | 0.5 | 0.6 |
| 800 nm~1,000 nm | $T_{MAX}$ | 0.6 | 0.6 |
| | $T_{AVG}$ | 0.3 | 0.4 |
| 1,000 nm~1,050 nm | $T_{MAX}$ | 1.0 | 1.2 |
| | $T_{AVG}$ | 0.6 | 0.5 |
| 1,050 nm | Transmittance (%) | 1.0 | 1.2 |

TABLE 15

| | | Example 13 | |
|---|---|---|---|
| | | Before Durability Test | After Durability Test |
| 350 nm~390 nm | $T_{MAX}$ | 2.5 | 2.3 |
| | $T_{AVG}$ | 0.5 | 0.5 |
| T50% cut-on | Wavelength (nm) | 411 | 411 |
| 425 nm~560 nm | $T_{MAX}$ | 87.0 | 85.8 |
| | $T_{AVG}$ | 81.9 | 80.7 |
| T50% cut-off | Wavelength (nm) | 618 | 616 |
| 700 nm | Transmittance (%) | 0.7 | 1.1 |
| 700 nm~800 nm | $T_{MAX}$ | 0.8 | 1.3 |
| | $T_{AVG}$ | 0.5 | 0.9 |
| 800 nm~1,000 nm | $T_{MAX}$ | 0.6 | 0.6 |
| | $T_{AVG}$ | 0.3 | 0.3 |
| 1,000 nm~1,050 nm | $T_{MAX}$ | 1.1 | 0.7 |
| | $T_{AVG}$ | 0.5 | 0.4 |
| 1,050 nm | Transmittance (%) | 1.1 | 0.5 |

The results of the adhesion strength evaluation of the moisture-resistant layer for the basic optical filter of Examples 10 to 13 with respect to the substrate are summarized in Table 16 below.

TABLE 16

| | Example 10 | Example 11 | Example 12 | Example 13 |
|---|---|---|---|---|
| Adhesion Strength | 4B | 5B | 5B | 4B |

Figure 14:
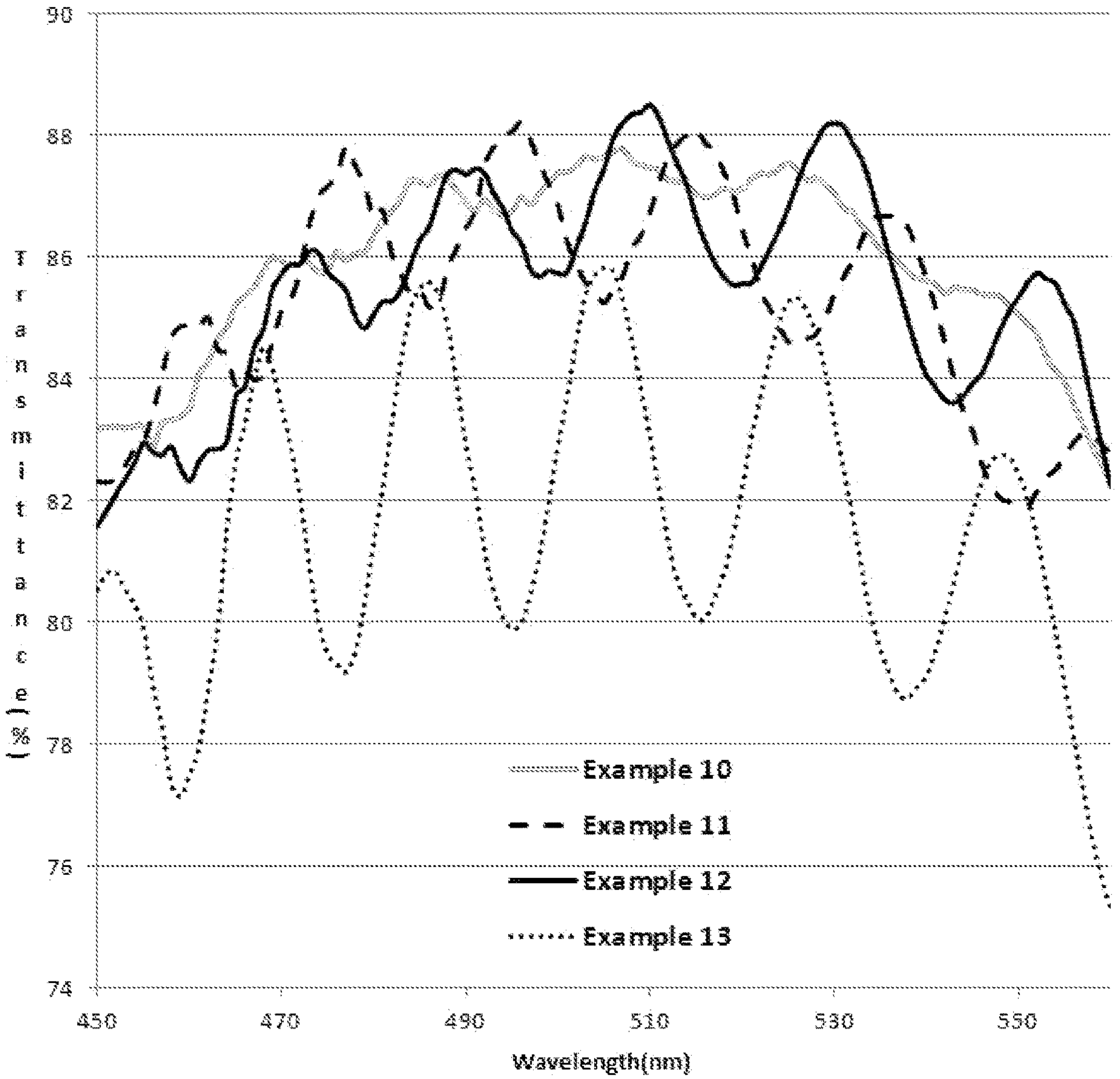
FIG. 14 is a spectral spectrum for confirming the ripple values of the basic optical filter of Examples 10 to 13.
Figure 15:
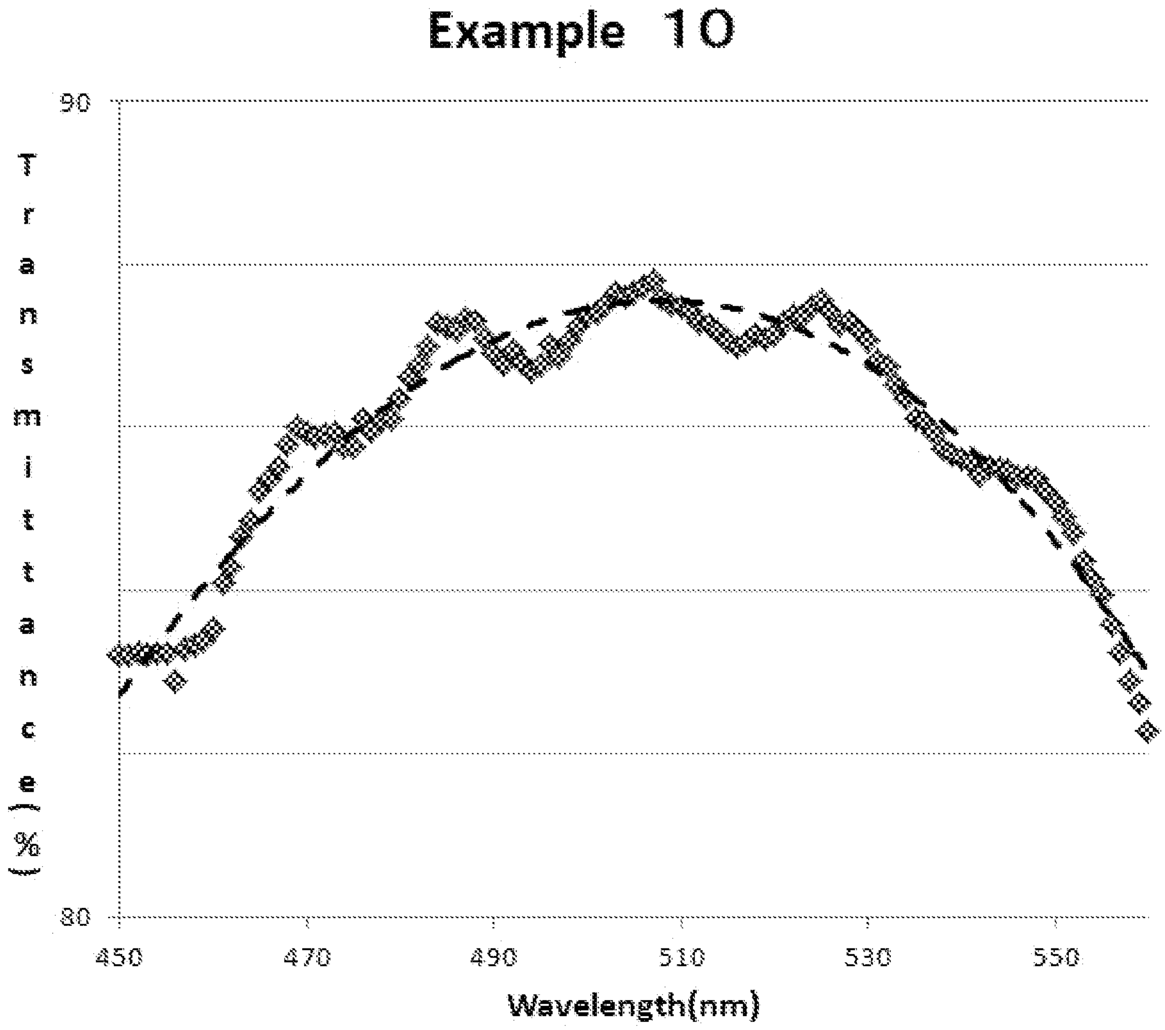
FIGS. 15 to 18 are spectral spectra for showing a process to obtain the ripple values for Examples 10 to 13.
Figure 16:
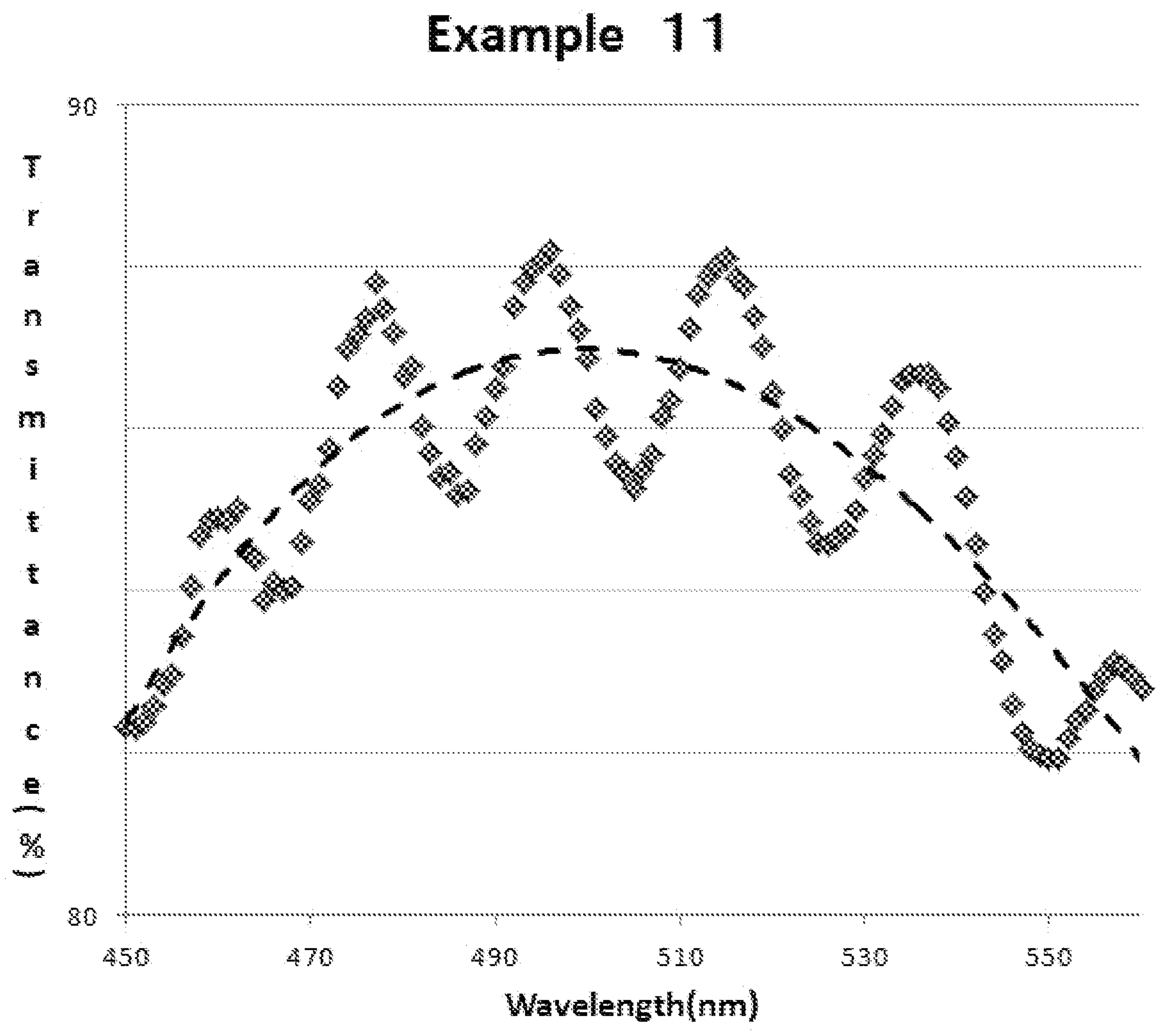
Figure 17:
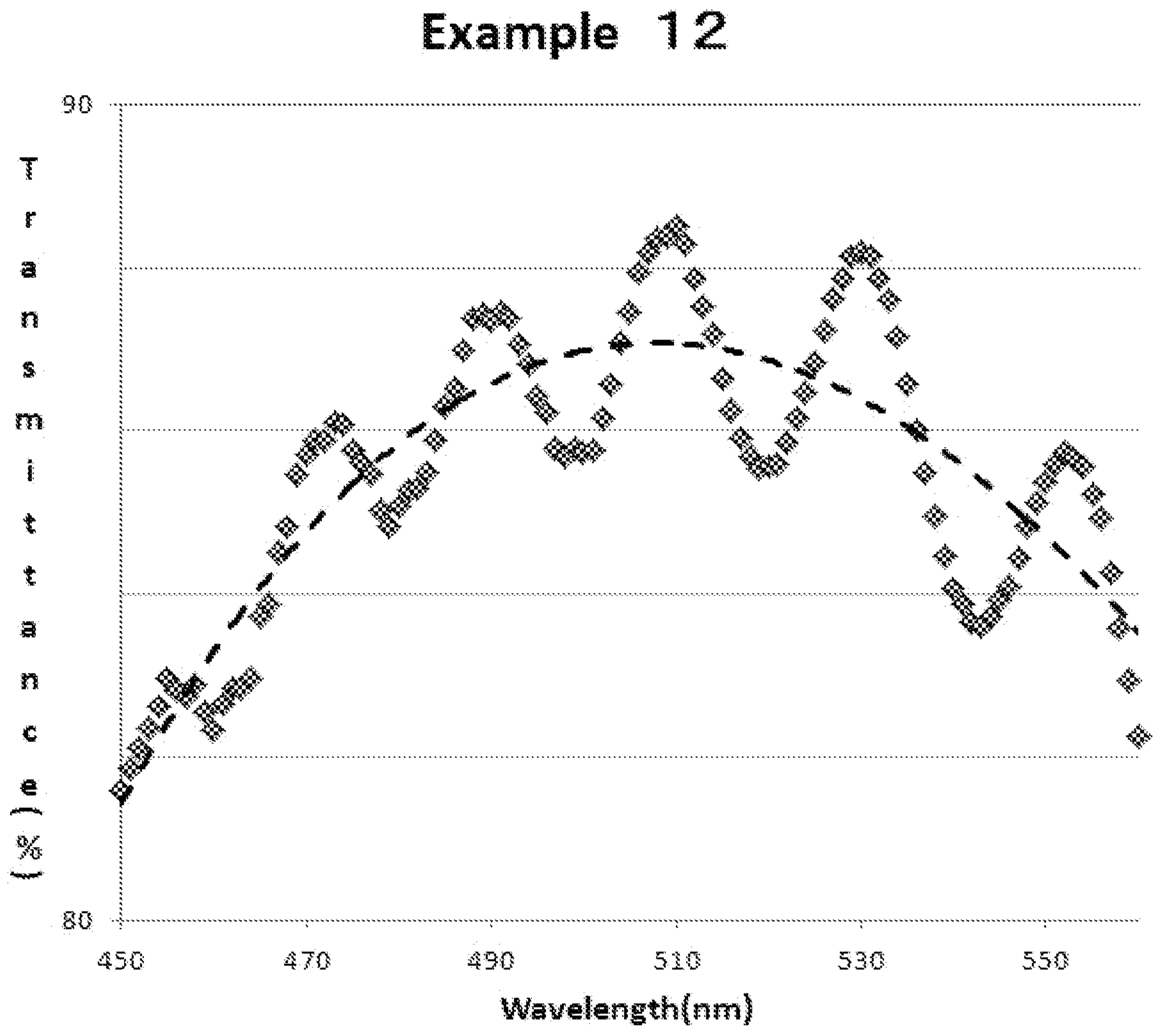
Figure 18:
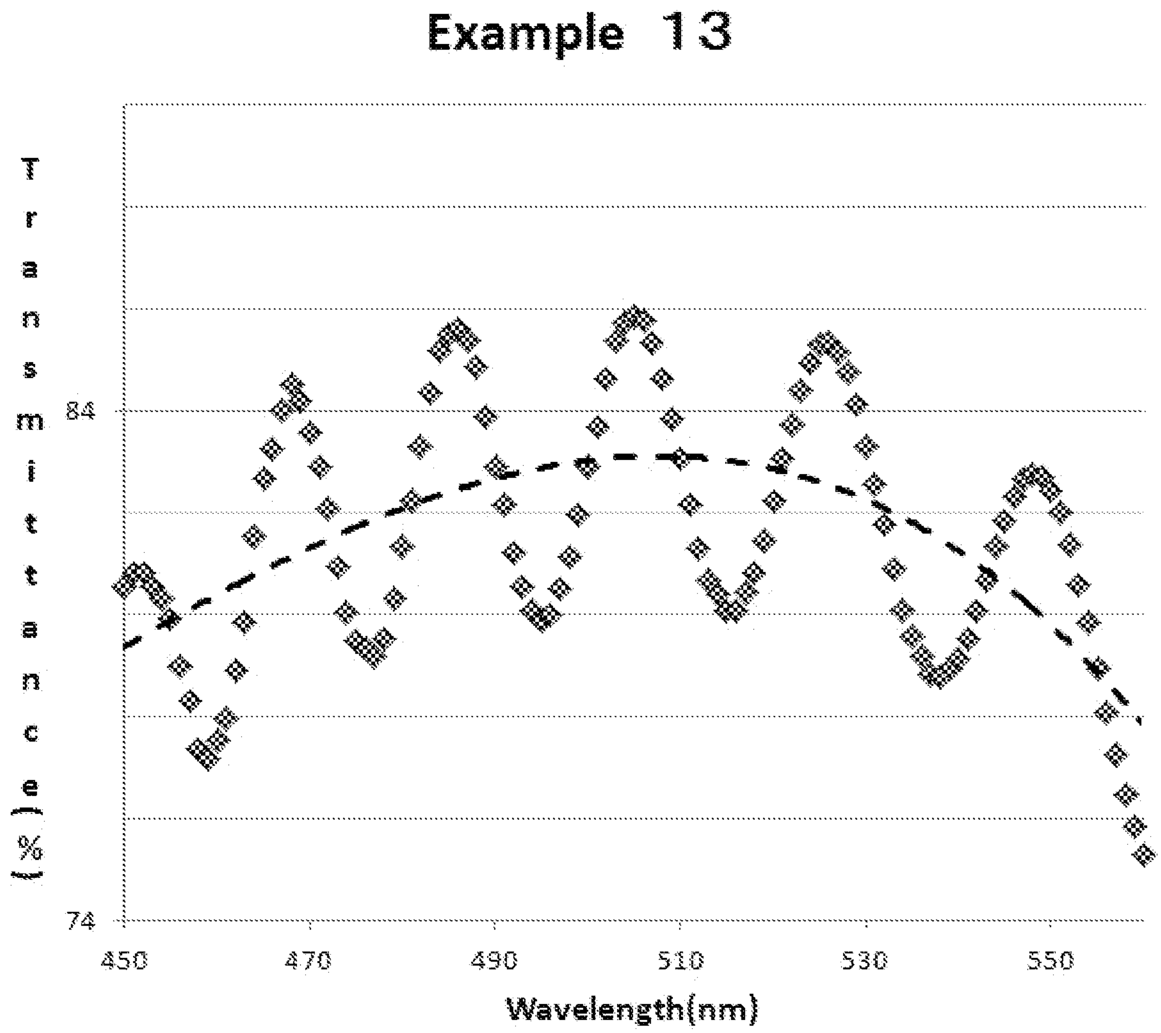

FIG. 14 is an enlarged view of a transmittance spectrum at wavelengths in the range of 450 nm to 560 nm to confirm the ripple value of the basic optical filter of Examples 10 to 13 (Incident Angle of 0°), and FIGS. 15 to 18 are spectra illustrating the process of obtaining the ripple value for each of Examples 10 to 13. Table 17 below summarizes the ripple values in the 450 nm to 560 nm wavelength region of the optical filters of Examples 10 to 13.

TABLE 17

| | Example 10 | Example 11 | Example 12 | Example 13 |
|---|---|---|---|---|
| Ripple Value (%) | 1.4 | 3.5 | 3.6 | 6.5 |

From the drawings and the above table, it can be seen that the ripple value increases from Example 10 to Example 13.

Example 14

A dielectric film was formed on the basic layer for an optical filter of Example 5. The dielectric film is formed by depositing a sub-layer using an ion-beam assisted vapor deposition method. The vacuum level and the temperature condition during the vapor deposition was $5.0\times10^{-5}$ Torr and 120° C., respectively, and Ion Beam Sputtering (IBS) source voltage was set to 350 V and current 850 mA. In the above manner, the dielectric layer was formed by alternatively stacking a high refractive layer—$TiO_2$ layer (refractive index of about 2.61) and a low refractive layer—$SiO_2$ layer (refractive index of about 1.46). A total of six layers of the high refractive layers and the low-refractive layers—the sub-layer was formed. Specifically, the $TiO_2$ layer (thickness about 12.4 nm), the $SiO_2$ layer (thickness about 30.3 nm), the $TiO_2$ layer (thickness about 43.7 nm), the $SiO_2$ layer (thickness about 13 nm), the $TiO_2$ layer (thickness about 30.4 nm) and the $SiO_2$ layer (thickness about 85.3 nm) on the infrared absorption layer were sequentially stacked to form the dielectric film. For the dielectric film, $n_1$ of the following Formula A was about 2.61 (the refractive index of the $TiO_2$ layer), $n_2$ was about 1.46 (the refractive index of the $SiO_2$ layer), and $n_s$ was about 1.57 (the refractive index of the infrared absorption glass), p is 2.5 (=(6-1)/2) and thus, V is about 5.70.

$$V = K\times\{[(n_1/n_2)^{2p}\times(n_1^2/n_s)-1]/[(n_1/n_2)^{2p}\times(n_1^2/n_s)+1]\}^2 \quad \text{[Equation 2]}$$

Next, an optical filter was prepared to include an infrared absorption glass with dielectric films existed on both sides of the glass by sequentially forming a $TiO_2$ layer (thickness about 12.4 nm), a $SiO_2$ layer (thickness about 30.3 nm), a $TiO_2$ layer (about 43.7 nm thick), and a $SiO_2$ layer (thickness about 13 nm), a $TiO_2$ layer (thickness about 30.4 nm) and a $SiO_2$ layer (thickness about 85.3 nm) on the surface of the infrared absorption glass where an infrared absorption layer was not formed. and a $SiO_2$ layer (thickness about 85.3 nm) being the outermost layer.

Table 18 below summarizes the transmittance spectral characteristics of the optical filter.

TABLE 18

| | | Example 14 |
|---|---|---|
| 350 nm~390 nm | $T_{MAX}$ | 2.7 |
| | $T_{AVG}$ | 0.4 |
| T50% cut-on Wavelength (nm) | | 410 |
| 425 nm~560 nm | $T_{MAX}$ | 95.6 |
| | $T_{AVG}$ | 92.5 |
| T50% cut-off Wavelength (nm) | | 627 |
| 700 nm Transmittance (%) | | 1.2 |
| 700 nm~800 nm | $T_{MAX}$ | 1.2 |
| | $T_{AVG}$ | 0.4 |
| 800 nm~1,000 nm | $T_{MAX}$ | 0.3 |
| | $T_{AVG}$ | 0.1 |
| 1,000 nm~1,050 nm | $T_{MAX}$ | 0.3 |
| | $T_{AVG}$ | 0.2 |
| 1,050 nm Transmittance (%) | | 0.3 |

Test Example 1

Figure 19:
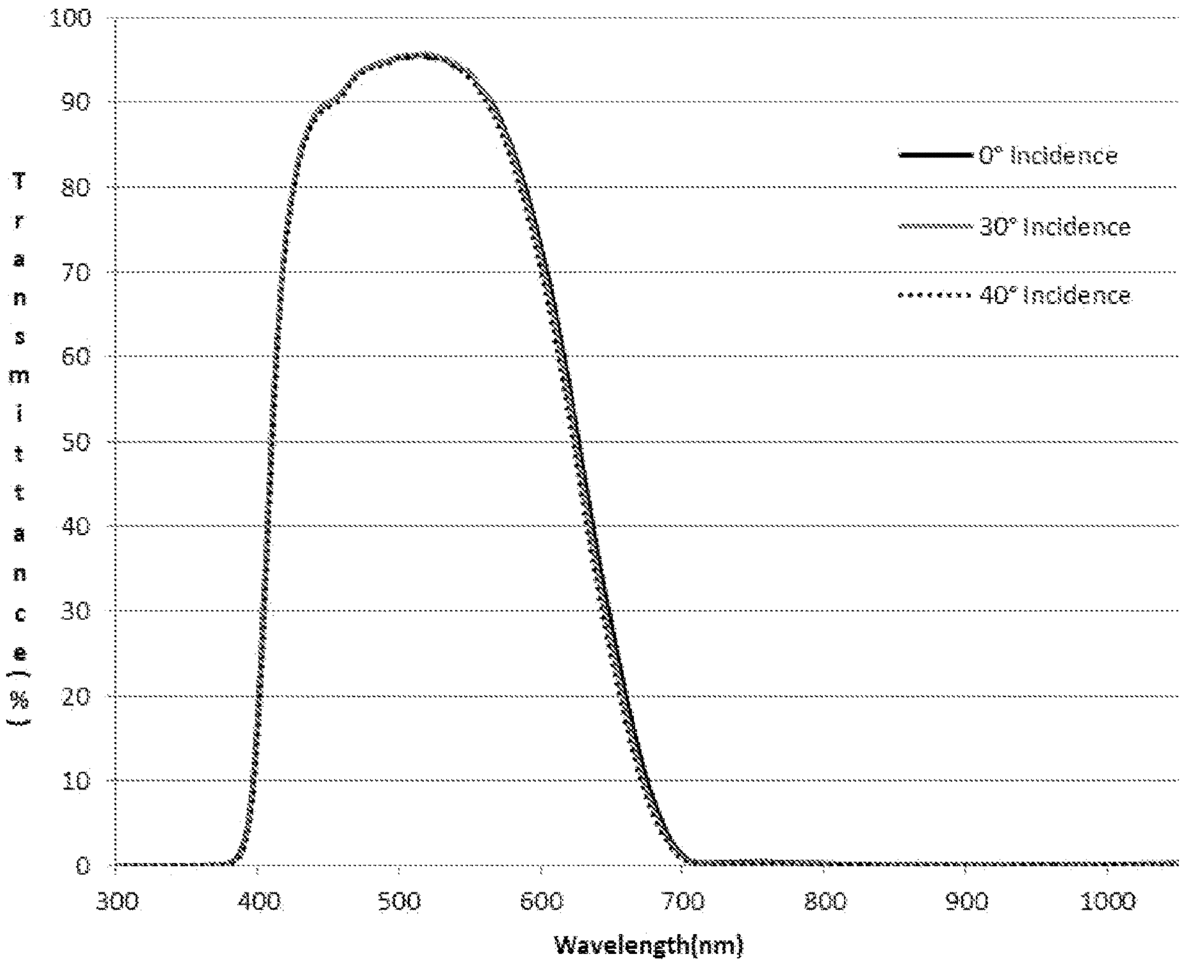
FIG. 19 is a spectral spectrum of the optical filter of Example 14.

The transmittance spectra were evaluated at incident angles of 0°, 300 and 40°, respectively, for the optical filter in Example 14, and the results are shown in FIG. 19. As can be seen from FIG. 19, the optical filter of Example 14 exhibited almost the same spectrum regardless of the incident angle. In addition, the T10% cut-on and T10% cut-off of the visible light transmission band did not substantially shift with respect to the incident angle.

What is claimed is:

1. A basic layer for an optical filter, the basic layer comprising:

an infrared absorption substrate; and a moisture-resistant layer disposed on one or both surfaces of the infrared absorption substrate, wherein the moisture-resistant layer comprises at least one selected from the group consisting of polysilazane, polysilane, polycarbosilane, fluoro-resin, epoxy resin, urethane resin, polysilsesquioxane, polycarbonate and polysiloxane, each having an average unit of Chemical Formula 3:

$$R_aSiO_{(4-a)/2},$$

wherein, in the Chemical Formula 3, R comprises an epoxy group, an amino group, a (meth)acrylic group, a (meth)acryloyloxy group, a (meth)acryloyloxyalkyl group, a mercapto group, a mercaptoalkyl group, a ureido group, an isocyanate group, a hydroxy group, or an isocyanatoalkyl group and a is 0.01 or more and less than 4;

wherein a ripple value at an incident angle of 0 degree of the basic layer in a wavelength range of 450 nm to 560 nm is 7% or less, and wherein an absolute value of $\Delta T_V$ according to Equation 1 is 30% or less:

$$\Delta T_V = 100\times(T_{V.f} - T_{V.i})/T_{V.i}, \text{ and} \quad \text{[Equation 1]}$$

wherein the $T_{V.f}$ is an average transmittance of the basic layer in a wavelength range of 425 nm to 560 nm after maintaining the basic layer at a temperature of about 85° C. and a relative humidity of 85% for 120 hours, and the $T_{V.i}$ is an average transmittance of the basic layer in the wavelength range of 425 nm to 560 nm before maintaining the basic layer at the temperature and the relative humidity.

2. The basic layer of claim 1, wherein an average transmittance of the basic layer in a wavelength range of 800 nm to 1000 nm is 6% or less.

3. The basic layer of claim 1, wherein a T50% cut-off wavelength of the basic layer is from 590 nm to 660 nm.

4. The basic layer of claim 3, wherein an average transmittance of the basic layer in a wavelength range of 425 nm to 560 nm of a transmission band is 75% or more.

5. The basic layer of claim 1, wherein the moisture-resistant layer is in contact with the infrared absorption substrate and wherein an adhesion strength of the moisture-resistant layer according to ASTM D3359 standard is 3B or more.

6. The basic layer of claim 1, wherein the infrared absorption substrate is a CuO containing fluorophosphate glass substrate or a CuO containing phosphate glass substrate.

7. The basic layer of claim 1, wherein the moisture-resistant layer has a thickness in a range of approximately 0.01 μm to 10 μm.

8. The basic layer of claim 1, further comprising a light absorption layer on one or both surfaces of the infrared absorption substrate.

9. An optical filter comprising:

the basic layer of claim 1; and a dielectric film formed on one or both surfaces of the infrared absorption substrate of the basic layer for an optical filter.

10. The optical filter of claim 9, wherein the dielectric film comprises a first sub-layer and a second sub-layer, wherein the first sub-layer and the second sub-layer have different refractive indices from each other, and wherein the first sub-layer and the second sub-layer are alternately stacked.

11. The optical filter of claim 10, wherein the first sub-layer and the second sub-layer are formed such that a V value according to the Equation 2 below is 17 or less:

$$V = K\times\{[(n_1/n_2)^{2p}\times(n_1^2/n_s)-1]/[(n_1/n_2)^{2p}\times(n_1^2/n_s)+1]\}^2 \quad \text{[Equation 2]}$$

wherein $n_1$ is a refractive index of the first sub-layer, $n_2$ is a refractive index of the second sub-layer, $n_s$ is a refractive index of the infrared absorption substrate, K is a total number of the first sub-layer and the second sub-layer in the dielectric film, and p is a number satisfying K=(2p+1).

12. The optical filter of claim 11, wherein a ratio ($n_1/n_2$) of the refractive index ($n_1$) of the first sub-layer relative to the refractive index ($n_2$) of the second sub-layer is in a range of 1.4 to 2.0.

13. The optical filter of claim 12, wherein the refractive index $n_1$ of the first sub-layer is in a range of 1.8 to 3.5.

14. The optical filter of claim 11, wherein a ratio ($n_1/n_s$) of the refractive index ($n_1$) of the first sub-layer relative to the refractive index ($n_s$) of the infrared absorption substrate is in a range of 1.4 to 2.0.

15. The optical filter of claim 11, wherein K in Equation 2 is 15 or less.

16. The optical filter of claim 11, wherein a thickness of each of the first sub-layer and the second sub-layer is from 5 nm to 200 nm and wherein an average value of the thickness of the first sub-layer and the thickness of the second sub-layer in the dielectric film is from 5 nm to 70 nm.

17. The optical filter of claim 9, wherein the dielectric film has a thickness in a range of 100 nm to 500 nm.

18. The optical filter of claim 9, wherein the dielectric film is formed on both surfaces of the infrared absorption substrate.

19. An image capturing device comprising the optical filter of claim 10.

* * * * *